United States Patent
Wang et al.

(10) Patent No.: US 12,390,072 B2
(45) Date of Patent: Aug. 19, 2025

(54) ESCAPING METHOD AND APPARATUS OF CLEANING ROBOT, MEDIUM AND ELECTRONIC DEVICE

(71) Applicant: Beijing Roborock Innovation Technology Co., Ltd., Beijing (CN)

(72) Inventors: Lei Wang, Beijing (CN); Lei Zhang, Beijing (CN)

(73) Assignee: Beijing Roborock Innovation Technology Co., Ltd., Beijing (CN)

( * ) Notice: Subject to any disclaimer, the term of this patent is extended or adjusted under 35 U.S.C. 154(b) by 91 days.

(21) Appl. No.: 18/264,978

(22) PCT Filed: Jun. 9, 2021

(86) PCT No.: PCT/CN2021/099201
§ 371 (c)(1),
(2) Date: Aug. 10, 2023

(87) PCT Pub. No.: WO2022/170712
PCT Pub. Date: Aug. 18, 2022

(65) Prior Publication Data
US 2024/0122435 A1  Apr. 18, 2024

(30) Foreign Application Priority Data
Feb. 10, 2021  (CN) .......................... 202110184810.7

(51) Int. Cl.
A47L 11/40  (2006.01)
A47L 11/24  (2006.01)
(Continued)

(52) U.S. Cl.
CPC .......... *A47L 11/4061* (2013.01); *A47L 11/24* (2013.01); *A47L 11/4002* (2013.01);
(Continued)

(58) Field of Classification Search
CPC ........................... A47L 11/4061; G05D 1/639
See application file for complete search history.

(56) References Cited

U.S. PATENT DOCUMENTS 4,754,520 A  7/1988 Steadings et al.
9,907,449 B2  3/2018 Lu et al.
(Continued)

FOREIGN PATENT DOCUMENTS

AU  2014221266 A1  9/2014
CN  202589457 U  12/2012
(Continued)

OTHER PUBLICATIONS

Decision of Rejection for JP Patent Application No. 2023-543382 of Dec. 24, 2024.
(Continued)

*Primary Examiner* — Ramsey Refai
(74) *Attorney, Agent, or Firm* — Perilla Knox & Hildebrandt LLP; Kenneth A. Knox

(57) ABSTRACT

An escaping method of a cleaning robot includes: when the cleaning robot encounters an obstacle and turns around while performing cleaning along an edge of a first surface medium area, in response to a surface medium change signal from the surface medium sensor indicates that a second surface medium area is detected, searching an established room map to determine whether the second surface medium area exists in the room map; if the second surface medium area exists, determining whether a route bypassing the second surface medium area exists based on the room map and a boundary of the second surface medium area in the room map; if the route exists, controlling the cleaning robot to travel along the route to bypass the second surface
(Continued)

medium area; and if the route does not exist, controlling the cleaning robot to return along a cleaned route to bypass the second surface medium area.

20 Claims, 14 Drawing Sheets

(51) Int. Cl.
  *G05D 1/242* (2024.01)
  *G05D 1/246* (2024.01)
  *G05D 1/639* (2024.01)
  G05D 105/10 (2024.01)
  G05D 107/40 (2024.01)

(52) U.S. Cl.
  CPC ........ *A47L 11/4011* (2013.01); *G05D 1/2424* (2024.01); *G05D 1/246* (2024.01); *G05D 1/639* (2024.01); *A47L 2201/04* (2013.01); *G05D 2105/10* (2024.01); *G05D 2107/40* (2024.01)

(56) References Cited

U.S. PATENT DOCUMENTS

| | | | |
|---|---|---|---|
| 10,716,446 | B2 | 7/2020 | Isenberg et al. |
| 2005/0251937 | A1 | 11/2005 | Ruffo |
| 2006/0278161 | A1 | 12/2006 | Burkholder et al. |
| 2009/0133204 | A1 | 5/2009 | Lin |
| 2014/0182627 | A1 | 7/2014 | Williams et al. |
| 2015/0032259 | A1 | 1/2015 | Kim et al. |
| 2016/0150934 | A1 | 6/2016 | Kim et al. |
| 2018/0035860 | A1 | 2/2018 | Tsuboi et al. |
| 2018/0242809 | A1 | 8/2018 | Reccanello |
| 2018/0255997 | A1 | 9/2018 | So et al. |
| 2020/0019181 | A1 | 1/2020 | Kim et al. |
| 2021/0034062 | A1 | 2/2021 | Ahn et al. |
| 2021/0034362 | A1 | 2/2021 | Williams et al. |
| 2021/0113038 | A1 | 4/2021 | Lee et al. |
| 2022/0047141 | A1 | 2/2022 | Xu et al. |
| 2022/0071467 | A1 | 3/2022 | Zhang et al. |
| 2022/0079406 | A1 | 3/2022 | Zhang et al. |
| 2022/0167821 | A1 | 6/2022 | Schnittman et al. |
| 2022/0248930 | A1 | 8/2022 | Li et al. |

FOREIGN PATENT DOCUMENTS

| | | | |
|---|---|---|---|
| CN | 106166050 | A | 11/2016 |
| CN | 206166838 | U | 5/2017 |
| CN | 107184156 | A | 9/2017 |
| CN | 107788913 | A | 3/2018 |
| CN | 108829115 | A | 11/2018 |
| CN | 109199205 | A | 1/2019 |
| CN | 109549573 | A | 4/2019 |
| CN | 109602352 | A | 4/2019 |
| CN | 109730588 | A | 5/2019 |
| CN | 208851397 | U | 5/2019 |
| CN | 109984688 | A | 7/2019 |
| CN | 110215166 | A | 9/2019 |
| CN | 110393477 | A | 11/2019 |
| CN | 110448241 | A | 11/2019 |
| CN | 110507253 | A | 11/2019 |
| CN | 110558900 | A | 12/2019 |
| CN | 110710932 | A | 1/2020 |
| CN | 110934545 | A | 3/2020 |
| CN | 111208811 | A | 5/2020 |
| CN | 111345744 | A | 6/2020 |
| CN | 111345745 | A | 6/2020 |
| CN | 111427357 | A | 7/2020 |
| CN | 111481097 | A | 8/2020 |
| CN | 111588317 | A | 8/2020 |
| CN | 211324758 | U | 8/2020 |
| CN | 211559965 | U | 9/2020 |
| CN | 111728536 | A | 10/2020 |
| CN | 211796249 | U | 10/2020 |
| CN | 111870196 | A | 11/2020 |
| CN | 111904346 | A | 11/2020 |
| CN | 112568810 | A | 3/2021 |
| CN | 112690713 | A | 4/2021 |
| CN | 112716373 | A | 4/2021 |
| CN | 112790672 | A | 5/2021 |
| CN | 112806915 | A | 5/2021 |
| CN | 112806916 | A | 5/2021 |
| CN | 112806917 | A | 5/2021 |
| CN | 113693499 | A | 11/2021 |
| CN | 215687460 | U | 2/2022 |
| JP | 2003135347 | A | 5/2003 |
| JP | 2005533567 | A | 11/2005 |
| JP | 2007286730 | A | 11/2007 |
| JP | 2009095361 | A | 5/2009 |
| JP | 2010075538 | A | 4/2010 |
| JP | 2015512684 | A | 4/2015 |
| JP | 2016000074 | A | 1/2016 |
| JP | 2018196622 | A | 12/2018 |
| JP | 2019084095 | A | 6/2019 |
| JP | 2019109845 | A | 7/2019 |
| JP | 2019141235 | A | 8/2019 |
| JP | 2020037023 | A | 3/2020 |
| JP | 2020194415 | A | 12/2020 |
| JP | 2022524826 | A | 5/2022 |
| KR | 20120055891 | A | 6/2012 |
| KR | 20120088314 | A | 8/2012 |
| KR | 20140126433 | A | 10/2014 |
| KR | 20190081316 | A | 7/2019 |
| RU | 2517013 | C1 | 5/2014 |
| RU | 2579137 | C1 | 3/2016 |
| RU | 2697154 | C1 | 8/2019 |
| TW | 201338747 | A | 10/2013 |
| TW | 202002880 | A | 1/2020 |
| TW | 202112292 | A | 4/2021 |
| TW | M633591 | U | 11/2022 |
| WO | 2016036183 | A1 | 3/2016 |
| WO | 2019233493 | A1 | 12/2019 |
| WO | 2020181724 | A1 | 9/2020 |
| WO | 2021008611 | A1 | 1/2021 |
| WO | 2021136023 | A1 | 7/2021 |
| WO | 2021228208 | A1 | 11/2021 |
| WO | 2022116584 | A1 | 6/2022 |

OTHER PUBLICATIONS

First Office Action for KR Patent Application No. 10-2023-7026473 of Feb. 27, 2025.
Extended European Search Report for EP Patent Application No. 21925375.4 of Dec. 19, 2024.
Extended European Search Report for EP Patent Application No. 21925366.3 of Dec. 13, 2024.
International Search Report for International Application No. PCT/CN2021/099201 of Oct. 27, 2021.
International Search Report for International Application No. PCT/CN2021/099231 of Sep. 28, 2021.
International Search Report for International Application No. PCT/CN2021/104162 of Nov. 2, 2021.
International Search Report for International Application No. PCT/CN2022/075724 of May 6, 2022.
First Office Action for TW Patent Application No. 111114721 of Dec. 28, 2022.
First Office Action for U.S. Appl. No. 17/678,559 of Jun. 27, 2022.
First Office Action for CN Patent Application No. 202110138563.7 of Sep. 23, 2021.
First Office Action for CN Patent Application No. 202110184810.7 of Apr. 27, 2022.
First Office Action for CN Patent Application No. 202110188181.5 of Apr. 15, 2022.
Second Office Action for CN Patent Application No. 202110188181.5 of Jan. 10, 2023.
Final Office Action for U.S. Appl. No. 18/116,355 of May 21, 2024.
First Office Action for TW Patent Application No. 112149355 of May 31, 2024.

(56) References Cited

OTHER PUBLICATIONS

First Office Action for JP Patent Application No. 2023-543382 of Jun. 25, 2024.
First Office Action for Russia Federation Patent Application No. 2023119971 of Dec. 12, 2023.
First Office Action for Russia Federation Patent Application No. 2023123044 of Feb. 15, 2024.
Non-Final Office Action for U.S. Appl. No. 18/116,355 of Feb. 15, 2024.
Notice of Allowance for JP Patent Application No. 2023-540845 of May 20, 2025.
First Office Action for TW Patent Application No. 114116176 of Jun. 23, 2025.

ESCAPING METHOD AND APPARATUS OF CLEANING ROBOT, MEDIUM AND ELECTRONIC DEVICE

CROSS REFERENCE TO RELATED APPLICATION

The present disclosure is a 35 U.S.C. 371 national phase application of International Application No. PCT/CN2021/099201 filed on Jun. 9, 2021, which claims the benefit of and priority to Chinese Patent Application No. 202110184810.7 filed on Feb. 10, 2021 and titled "ESCAPING METHOD AND APPARATUS OF CLEANING ROBOT, MEDIUM AND ELECTRONIC DEVICE", both of which are incorporated herein by reference in their entireties herein.

TECHNICAL FIELD

The present disclosure relates to the technical field of smart homes and, more particularly to an escaping method and apparatus of a cleaning robot, a computer-readable storage medium, and an electronic device.

BACKGROUND

With rapid development of computer technologies and artificial intelligence science in recent years, smart robot technologies gradually become a research hotspot in modern robots. As the most practical type among smart robots, sweeping robots can automatically clean the ground with a certain level of artificial intelligence.

Currently, carpets are being installed in more and more homes. After cleaning a narrow gap area between a carpet and a wall, a sweeping robot can be easily stuck when turning around.

However, there is no handling method at present for the above sticking problem, and the sweeping robot can only be in a stuck state or wait for escape under the help of a human.

SUMMARY

According to one aspect of the present disclosure, there is provided an escaping method of a cleaning robot, applied to a cleaning robot including a surface medium sensor and the escaping method includes:
  when the cleaning robot encounters an obstacle and turns around while performing cleaning along an edge of a first surface medium area, in response to a surface medium change signal from the surface medium sensor indicates that a second surface medium area is detected, searching an established room map to determine whether the second surface medium area exists in the room map;
  if the second surface medium area exists in the room map, determining whether a route bypassing the second surface medium area exists based on the room map and a boundary of the second surface medium area in the room map;
  if the route exists, controlling the cleaning robot to travel along the route to bypass the second surface medium area; and
  if the route does not exist, controlling the cleaning robot to return along a cleaned route to bypass the second surface medium area.
In an exemplary embodiment of the present disclosure, the method further includes:
  if the second surface medium area does not exist in the room map, scanning the edge of the second surface medium area, and storing a scanning result in the room map.

In an exemplary embodiment of the present disclosure, when the cleaning robot encounters the obstacle and turns around while performing cleaning along the edge of the first surface medium area, in response to the surface medium change signal from the surface medium sensor indicates that the second surface medium area is detected, the method further includes:
  detecting whether at least a part of the cleaning robot has entered the second surface medium area; and
  if at least a part of the cleaning robot has entered the second surface medium area, controlling the cleaning robot to travel in an opposite direction to leave the second surface medium area.

In an exemplary embodiment of the present disclosure, detecting whether at least a part of the cleaning robot has entered the second surface medium area includes:
  detecting whether a position at which the surface medium sensor of the cleaning robot is located is within the second surface medium area; and
  if the position at which the surface medium sensor of the cleaning robot is located is within the second surface medium area, determining that the cleaning robot has entered the second surface medium area.

In an exemplary embodiment of the present disclosure, detecting whether a position at which the surface medium sensor of the cleaning robot is located is within the second surface medium area includes:
  controlling the surface medium sensor to transmit an ultrasonic signal vertically to a current surface, and receiving an actual echo signal reflected by the current surface, wherein the surface medium sensor is an ultrasonic sensor; and
  determining whether the actual echo signal is different from an echo signal of the first surface medium area, and if yes, determining that the position at which the surface medium sensor is located is within the second surface medium area.

In an exemplary embodiment of the present disclosure, controlling the cleaning robot to return along the cleaned route includes:
  when it is determined that the cleaning robot leaves the second surface medium area, controlling the cleaning robot to rotate in situ, so that a traveling direction of the cleaning robot is parallel to an edge of the first surface medium area; and
  controlling the cleaning robot to return along the traveling direction.

In an exemplary embodiment of the present disclosure, after the second surface medium area has been detected, the method further includes:
  detecting whether the cleaned route of the cleaning robot is a wall-following route; and
  if the cleaned route of the cleaning robot is the wall-following route, controlling the cleaning robot to return along the wall-following route.

In an exemplary embodiment of the present disclosure, the method further includes: determining, based on the room map, whether the second surface medium area is located behind the cleaning robot; and
  if the second surface medium area is located behind the cleaning robot, controlling the cleaning robot to return along the cleaned route.

In an exemplary embodiment of the present disclosure, controlling the cleaning robot to return along the wall-following route or the cleaned route includes:
controlling the cleaning robot to travel backward along the wall-following route or the cleaned route;
enabling in-situ rotation when a backward traveling distance reaches a preset distance; and
if the second surface medium area is detected in response to the surface medium change signal from the surface medium sensor, controlling the cleaning robot to continue to travel backward until the surface medium sensor cannot detect the surface medium change signal.

In an exemplary embodiment of the present disclosure, if the route does not exist, the method further includes:
ignoring the surface medium change signal from the surface medium sensor, and continuing controlling the cleaning robot to turn around and return along the cleaned route.

In an exemplary embodiment of the present disclosure, in a process of ignoring the surface medium change signal from the surface medium sensor and controlling the cleaning robot to turn around and return along the cleaned route, the method further includes:
detecting whether the surface medium change signal from the surface medium sensor disappears; and
if the surface medium change signal from the surface medium sensor disappears, controlling the cleaning robot to travel forward by a preset distance and then to stop traveling and rotate in a circle, and detecting whether the cleaning robot leaves the second surface medium area.

In an exemplary embodiment of the present disclosure, detecting whether the cleaning robot leaves the second surface medium area includes:
if the surface medium sensor triggers the surface medium change signal, controlling the cleaning robot to continue to travel along the cleaned route; and
if the surface medium sensor does not trigger the surface medium change signal, entering a normal cleaning mode.

In an exemplary embodiment of the present disclosure, the method is used when the cleaning robot is in a mode in which only the first surface medium area is to be cleaned.

According to another aspect of the present disclosure, there is provided an escaping apparatus of a cleaning robot, applied to a cleaning robot including a surface medium sensor and the escaping apparatus includes:
a surface medium determination module which is configured to: when the cleaning robot performing encounters an obstacle and turns around while cleaning along an edge of a first surface medium area, in response to a surface medium change signal from the surface medium sensor indicates that a second surface medium area is detected, search an established room map to determine whether the second surface medium area exists in the room map;
a first control module which is configured to: if the second surface medium area exists in the room map, determine whether a route bypassing the second surface medium area exists based on the room map and a boundary of the second surface medium area in the room map; and if the route exists, control the cleaning robot to travel along the route to bypass the second surface medium area; and
a second control module which is configured to: if the route does not exist, control the cleaning robot to return along a cleaned route to bypass the second surface medium area.

According to yet another aspect of the present disclosure, there is provided a computer-readable storage medium storing a computer program thereon. When the computer program is executed by a processor, the above escaping method of the cleaning robot can be implemented.

According to yet another aspect of the present disclosure, there is provided an electronic device including:
a processor; and
a memory for storing processor-executable instructions, wherein the processor is configured to execute the processor-executable instructions to perform the above escaping method of the cleaning robot.

It should be understood that the above general descriptions and the followed detailed descriptions and only exemplary and illustrative, and cannot limit the present disclosure.

BRIEF DESCRIPTION OF THE DRAWINGS

The accompanying drawings, which are incorporated into and constitute a part of this specification, illustrate embodiments conforming to the present disclosure and, together with the description, serve to explain the principles of the present disclosure. Understandably, the accompanying drawings in the following description are only some embodiments of the present disclosure, and a person of ordinary skill in the art may still derive other drawings from these accompanying drawings without creative efforts.

DETAILED DESCRIPTION

Figure 1:
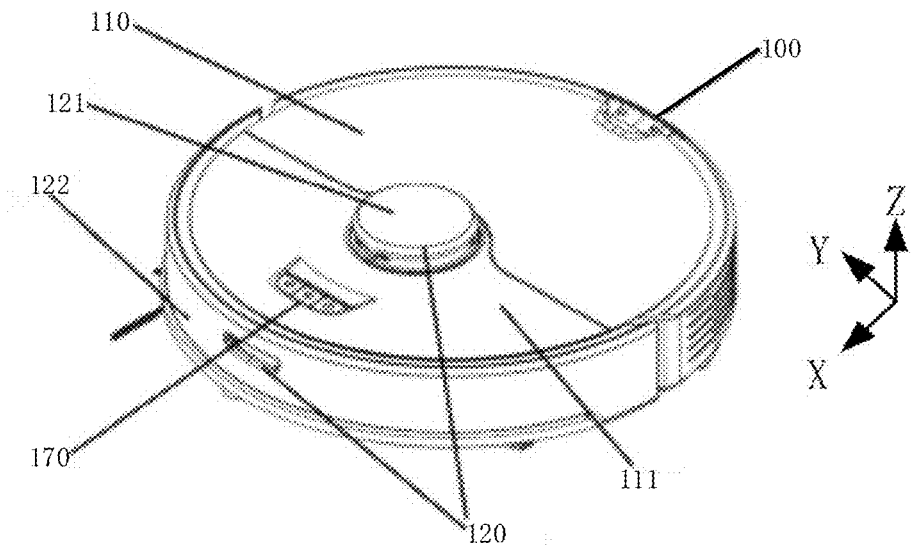
FIG. 1 is an oblique view of an automatic cleaning apparatus according to one embodiment of the present disclosure.

Exemplary embodiments will now be described more fully with reference to the accompanying drawings. However, the exemplary embodiments may be implemented in various forms, and should not be understood as limited to the embodiments set forth herein; rather, provision of these embodiments may enable the present disclosure to be more comprehensive and complete and thereby fully convey the concept of exemplary embodiments to those skilled in the art. The same reference numerals in the drawings denote the same or similar parts, and thus their detailed descriptions will be omitted.

Although relative terms such as "upper" and "lower" are used in the description to describe the relative relationship of one component with respect to another component as shown in the figures, these terms are used in this specification only for convenience, for example, based on the exemplary directions shown in the figures. It is to be understood that if an apparatus shown in the figures is turned upside down, the described "upper" component will become a "lower" component. Other relative terms such as "high", "low", "top", "bottom", "left" and "right" have similar meanings. When a structure is "on" another structure, it may mean that the structure is integrally formed on the other structure, or that the structure is "directly" provided on the another structure, or that the structure is "indirectly" provided on the another structure via still another structure.

The terms "a", "an", and "the" are used to indicate the presence of one or more elements, components, etc. The terms "include" and "have" are used to indicate the meaning of including in an open manner and indicate that there may be other elements, components, etc. in addition to the listed elements, components, etc.

Figure 2:
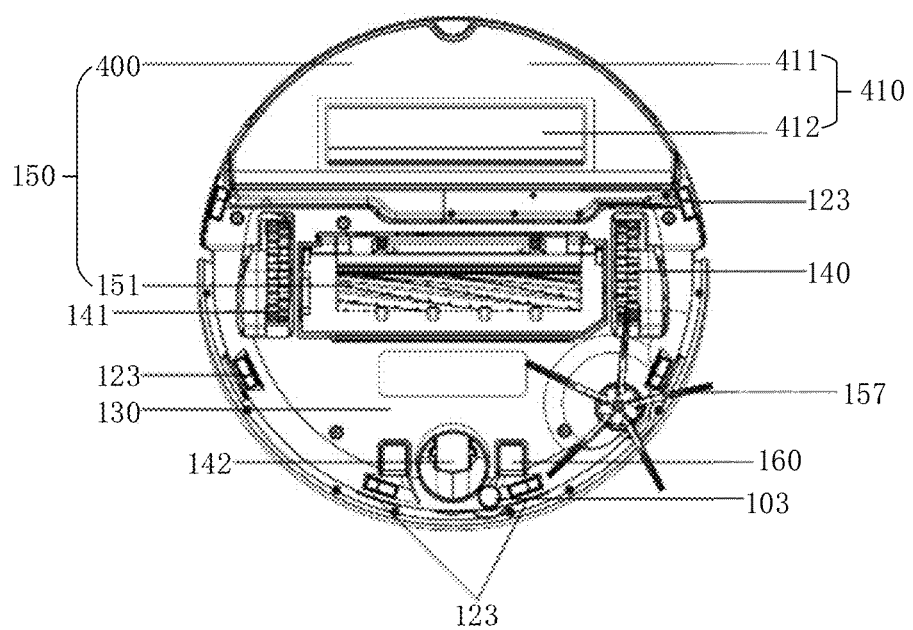
FIG. 2 is a schematic structural diagram of a bottom of an automatic cleaning apparatus according to one embodiment of the present disclosure.

FIGS. 1-2 are schematic structural diagrams of an automatic cleaning apparatus according to an exemplary embodiment. As shown in FIGS. 1-2, the automatic cleaning apparatus may be a vacuum ground sucking robot, or may be a ground mopping/brushing robot, or may be a window climbing robot, etc. The automatic cleaning apparatus may include a mobile platform 100, a perception system 120, a control system 130, a driving system 140, a cleaning module 150, an energy system 160, and a human-computer interaction system 170.

The mobile platform 100 may be configured to automatically move on an operating surface in a target direction. The operating surface may be a surface to be cleaned by the automatic cleaning apparatus. In some embodiments, the automatic cleaning apparatus may be a ground mopping robot and, thus, the automatic cleaning apparatus works on a ground which is the operating surface. The automatic cleaning apparatus mat also be a window cleaning robot and, thus, the automatic cleaning apparatus works on an outer surface of glass of a building, and the glass is the operating surface. The automatic cleaning apparatus may also be a pipe cleaning robot and, thus, the automatic cleaning apparatus works on an inner surface of the pipe, and the inner surface of the pipe is the operating surface. For the purpose of discussion only, the following description in this application takes a ground mopping robot as an example for illustration.

In some embodiments, the mobile platform 100 may be an autonomous mobile platform or a non-autonomous mobile platform. The autonomous mobile platform means that the mobile platform 100 itself can automatically and adaptively make an operational decision based on an unexpected environmental input. The non-autonomous mobile platform means that the mobile platform 100 itself cannot adaptively make an operational decision based on an unexpected environmental input, but can execute a given procedure or operate according to a certain logic. Correspondingly, when the mobile platform 100 is the autonomous mobile platform, the target direction may be determined autonomously by the automatic cleaning apparatus. When the mobile platform 100 is the non-autonomous mobile platform, the target direction may be set systematically and manually. When the mobile platform 100 is the autonomous mobile platform, the mobile platform 100 comprises a forward portion 111 and a backward portion 110.

The perception system 120 comprises a position determining device 121 located above the mobile platform 100, a buffer 122 located at the forward portion 111 of the mobile platform 100, a cliff sensor 123 located at a bottom of the mobile platform 100, and sensing devices, such as an ultrasonic sensor (not shown in the figures), an infrared sensor (not shown in the figures), a magnetometer (not shown in the figures), an accelerometer (not shown in the figures), a gyroscope (not shown in the figures), and an odometer (not shown in the figures), for providing various position information and motion state information of the automatic cleaning apparatus to the control system 130.

In order to more clearly describe behaviors of the automatic cleaning apparatus, the following directions are defined: the automatic cleaning apparatus may travel on the ground by various combinations of movements relative to the following three mutually perpendicular axes defined by the mobile platform 100: a transversal axis X, a front and rear axis Y and a center vertical axis Z. A forward driving direction along the front and rear axis Y is designated as "forward" and a backward driving direction along the front and rear axis Y is designated as "backward". The transversal axis X extends substantially between a right wheel and a left wheel of the automatic cleaning apparatus along an axis center defined by a center point of the driving wheel assembly 141. The automatic cleaning apparatus may rotate around the X axis. It is called "pitch up" when the forward portion of the automatic cleaning apparatus is tilted upward and the backward portion thereof is tilted downward, and it is called "pitch down" when the forward portion of the automatic cleaning apparatus is tilted downward and the backward portion thereof is tilted upward. In addition, the automatic cleaning apparatus may rotate about the Z axis. In a forward direction of the automatic cleaning apparatus, it is called "turn right" when the automatic cleaning apparatus is tilted to the right of the Y axis, and it is called "turn left" when the automatic cleaning apparatus is tilted to the left of the Y axis.

As shown in FIG. 2, cliff sensors 123 are provided at the bottom of the mobile platform 100 and in front and rear of the driving wheel assembly 141, respectively, for preventing the automatic cleaning apparatus from falling off when the automatic cleaning apparatus retreats, so as to avoid damage to the automatic cleaning apparatus. The aforementioned "front" refers to the side same as a traveling direction of the automatic cleaning apparatus, and the aforementioned "rear" refers to the side opposite to the traveling direction of the automatic cleaning apparatus.

The position determining device 121 comprises, but is not limited to, a camera and a laser distance sensor (LDS, Laser Direct Structuring).

The various components in the perception system 120 may operate independently, or operate together to achieve a purpose function more accurately. The surface to be cleaned is identified through the cliff sensor 123 and the ultrasonic sensor to determine physical properties of the surface to be cleaned, including a surface medium, degree of cleanliness, etc., which may be more accurately determined in combination with the camera and the laser distance sensor, etc.

For example, the ultrasonic sensor may determine whether the surface to be cleaned is a carpet. If the ultrasonic sensor determines that the surface to be cleaned is made of a carpet material, the control system 130 controls the automatic cleaning apparatus to perform a carpet mode cleaning.

The forward portion 111 of the mobile platform 100 is provided with the buffer 122. During cleaning, when the driving wheel assembly 141 propels the automatic cleaning apparatus to travel on the ground, the buffer 122 detects one or more events (or objects) in a traveling path of the automatic cleaning apparatus via a sensor system, such as an infrared sensor, and the automatic cleaning apparatus may control the driving wheel assembly 141 based on the events (or objects) detected by the buffer 122, such as obstacles and walls, so as to cause the automatic cleaning apparatus to respond to the events (or objects), such as moving away from the obstacles.

The control system 130 is disposed on a main circuit board inside the mobile platform 100, and includes a computing processor, such as a central processing unit and an application processor that communicate with a non-transitory memory such as a hard disk, a flash memory, and a random-access memory. The application processor is configured to receive environmental information sensed by a plurality of sensors and transmitted from the perception system 120, to draw a simultaneous map of an environment where the automatic cleaning apparatus is located based on obstacle information fed back by the laser distance sensor by use of a positioning algorithm, such as SLAM, to autonomously determine a travelling path based on the environmental information and the environmental map, and then to control the driving system 140 to perform operations such as travelling forward, travelling backward, and/or steering based on the autonomously determined travelling path. Further, the control system 130 may also determine whether to activate the cleaning module 150 to perform a cleaning operation based on the environmental information and the environmental map.

Specifically, the control system 130 may, based on distance information and speed information which are fed back by the buffer 122, the cliff sensor 123, and sensing devices (e.g., the ultrasonic sensor, the infrared sensor, the magnetometer, the accelerometer, the gyroscope, and the odometer), comprehensively determine a current operating state of the ground sweeping robot, such as crossing a doorsill, getting on a carpet, locating at the edge of a cliff, being stuck from above or below, having a full dust box, being picked up, etc., and will also give a specific next action strategy for different situations, so that the work of the automatic cleaning apparatus meets the owner's requirements and provides better user experience. Further, the control system may plan the most efficient and reasonable cleaning path and cleaning mode based on the simultaneous map drawn by SLAM, which greatly improves the cleaning efficiency of the automatic cleaning apparatus.

Figure 3:
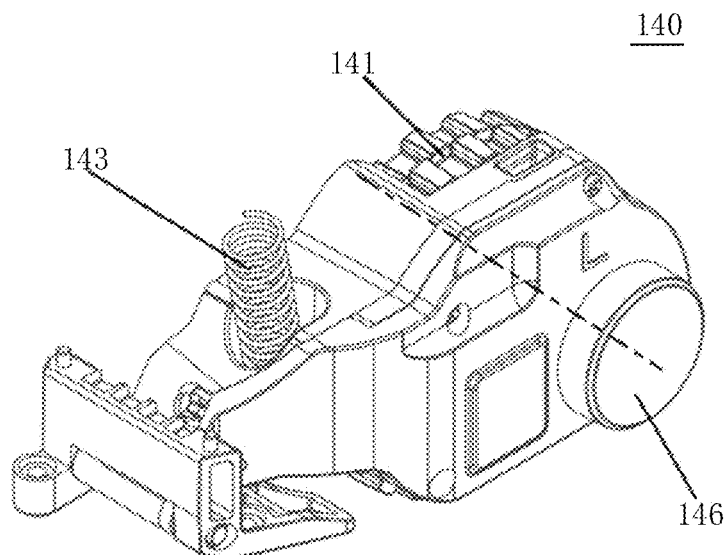
FIG. 3 is an oblique view of a driving wheel assembly on one side according to one embodiment of the present disclosure.
Figure 4:
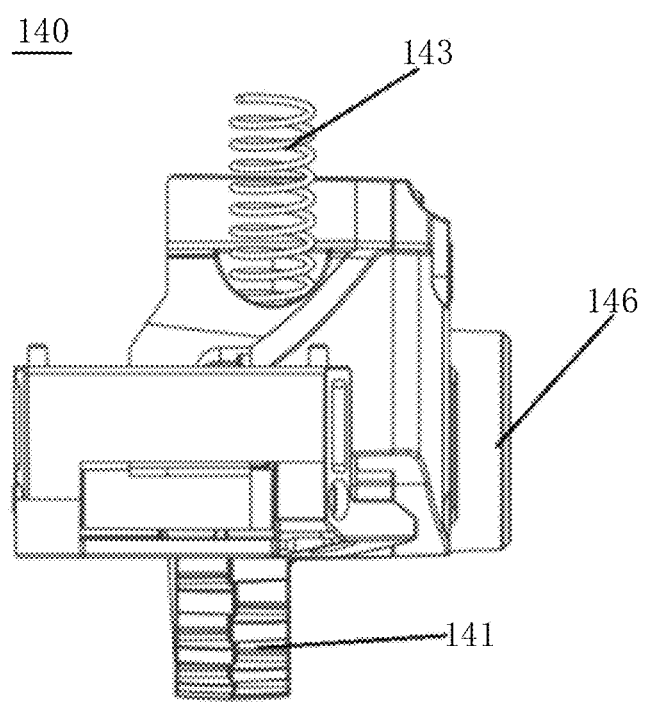
FIG. 4 is a front view of a driving wheel assembly on one side according to one embodiment of the present disclosure.

The driving system 140 may execute a driving command based on specific distance and angular information, such as x, y, and theta components, so as to manipulate the automatic cleaning apparatus to travel across the ground. FIGS. 3 and 4 are an oblique view and a front view of a driving wheel assembly 141 on one side according to an embodiment of the present disclosure, respectively. As shown in the figures, the driving system 140 includes the driving wheel assembly 141, and may control a left wheel and a right wheel simultaneously. In order to more precisely control the motion of the automatic cleaning apparatus, the driving system 140 optionally includes a left driving wheel assembly and a right driving wheel assembly, respectively. The left driving wheel assembly and the right driving wheel assembly are arranged symmetrically along the transverse axis defined by the mobile platform 100. The driving wheel assemblies each includes a housing and a connecting frame. Driving motors 146 are arranged inside the driving wheel assemblies respectively, and are located at an outer side of the driving wheel assemblies 141, respectively. An axis center of the driving motor 146 is within a cross-sectional projection of the driving wheel assembly, and the driving wheel assembly 141 may also be connected to a circuit for measuring a driving current and the odometer.

In order for the automatic cleaning apparatus to move on the ground more stably or have a higher movement ability, the automatic cleaning apparatus may include one or more steering assemblies 142, and the steering assembly 142 may be a driven wheel or a driving wheel, and structurally includes but is not limited to a universal wheel. The steering assembly 142 may be located in front of the driving wheel assembly 141.

The driving motor 146 provides power for rotation of the driving wheel assembly 141 and/or the steering assembly 142.

The driving wheel assembly 141 may be detachably connected to the mobile platform 100 to facilitate disassembly, assembly, and maintenance. The driving wheel may have an offset drop suspension system which is movably fastened, e.g., rotatably attached, to the mobile platform 100 of the automatic cleaning apparatus, and maintains contact and traction with the ground at a certain grounding force by an elastic element 143 such as a tension spring or a compression spring, and meanwhile, the cleaning module 150 of the automatic cleaning apparatus is also in contact with the surface to be cleaned at a certain pressure.

The energy system 160 comprises a rechargeable battery, such as a nickel-hydride battery and a lithium battery. The rechargeable battery may be connected with a charging control circuit, a battery pack charging temperature detecting circuit, and a battery undervoltage monitoring circuit; and the charging control circuit. The battery pack charging temperature detecting circuit and the battery undervoltage monitoring circuit are then connected to a single-chip microcomputer control circuit. A host of the automatic cleaning apparatus is connected to a charging pile through a charging electrode disposed on a side of or below a body of the automatic cleaning apparatus for charging. If dust is adhered to the exposed charging electrode, plastic machine parts around the electrode will become molten and deformed, or even the charging electrode itself will be deformed due to an accumulation effect of charges during charging, and normal charging will fail.

The human-computer interaction system 170 includes buttons on a panel of the host of the automatic cleaning apparatus, and the buttons are used by a user to select functions. The human-computer interaction system 170 may also include a display screen and/or an indicator light and/or a horn. The display screen, the indicator light and the horn present a current state or function items of the automatic cleaning apparatus to the user. The human-computer interaction system 170 may also include a mobile client program. For a route navigation type cleaning apparatus, the mobile client may present a map of the environment where the apparatus is located, as well as a location of the apparatus to the user, which may provide the user with richer and more user-friendly function items.

The cleaning module 150 may comprise a dry cleaning module 151 and/or a wet cleaning module 400.

As shown in FIGS. 5-8, the dry cleaning module 151 includes a rolling brush, a dust box, a blower, and an air outlet. The rolling brush, having a certain interference with the ground, sweeps up garbage on the ground, and rolls up the garbage to the front of a dust sucking port between the rolling brush and the dust box. Then, the garbage is sucked into the dust box by air, which has a sucking force, that is generated by the blower and passes through the dust box. The dust removal capacity of the ground sweeping robot may be characterized by the dust pickup efficiency (DPU) of the garbage. The DPU is affected by a structure and material of the rolling brush, the utilization rate of air in an air passage formed by the dust sucking port, the dust box, the blower, the air outlet, and connecting components among the dust sucking port, the dust box, the blower, the air outlet, and a type and power of the blower, which is a complex system design problem. Compared with an ordinary plug-in vacuum cleaner, for an automatic cleaning apparatus with limited energy, the improvement of dust removal capacity is more meaningful. Because the improvement of the dust removal capacity directly and effectively reduces the demand for energy, that is to say, the original cleaning apparatus that may clean 80 square meters of ground on a single charge may be evolved to clean 180 square meters or more on a single charge. In addition, the service life of the battery having a reduced number of charging times will also be greatly prolonged, so that the frequency of replacing the battery by the user will be reduced. What is more intuitive and important is that the improvement of the dust removal capacity is the most understood and important user experience as the user will directly come to a conclusion about whether the thorough cleaning is achieved. The dry cleaning module may also include a side brush 157 having a rotating shaft angled relative to the ground, for moving debris to a region of the rolling brush of the cleaning module 150.

Figure 5:
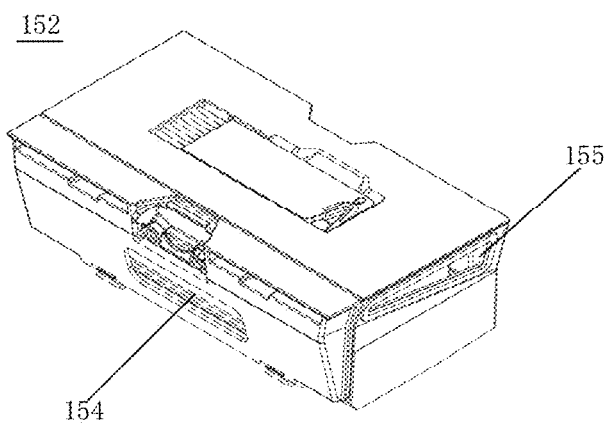
FIG. 5 is an oblique view of a dust box according to one embodiment of the present disclosure.
Figure 6:
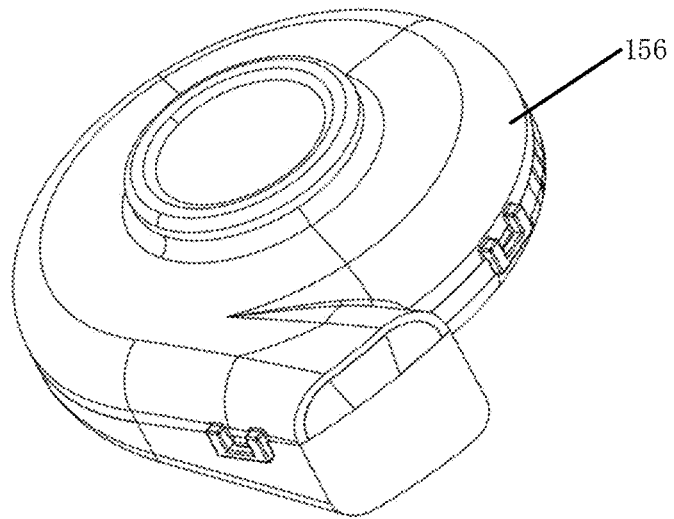
FIG. 6 is an oblique view of a blower according to one embodiment of the present disclosure.
Figure 7:
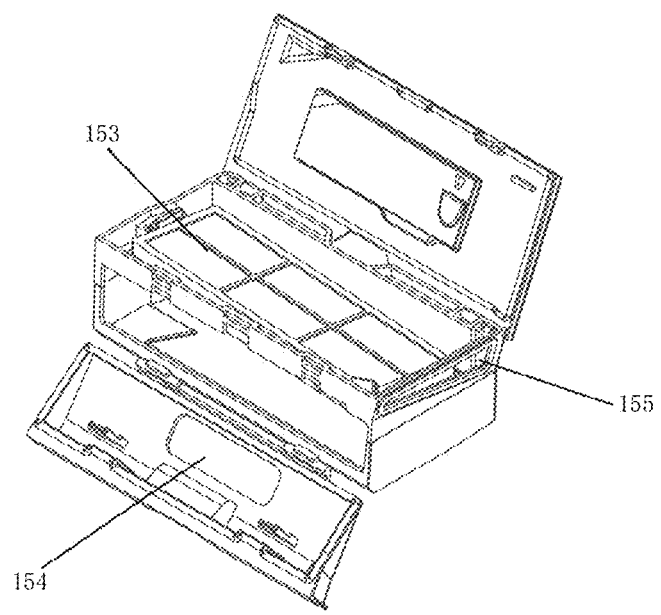
FIG. 7 is a schematic diagram of a dust box in an open state according to one embodiment of the present disclosure.
Figure 8:
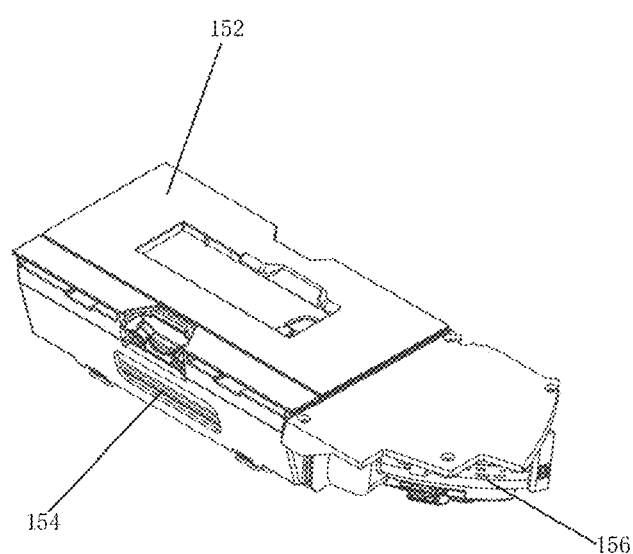
FIG. 8 is a schematic diagram of a dust box and a blower in an assembled state according to one embodiment of the present disclosure.

FIG. 5 is a schematic structural diagram of a dust box 152 in the dry cleaning module, FIG. 6 is a schematic structural diagram of a blower 156 in the dry cleaning module, FIG. 7 is a schematic diagram of the dust box 152 in an open state, and FIG. 8 is a schematic diagram of the dust box and the blower in an assembled state.

The rolling brush having a certain interference with the ground sweeps up garbage on the ground and rolls up the garbage to the front of the dust sucking port 154 between the rolling brush and the dust box 152 and then the garbage is sucked into the dust box 152 by the air which has a sucking force, is generated by the blower 156 and passes through the dust box 152. The garbage is isolated by a filtering mesh 153 on an inner side of the dust box 152 close to the dust sucking port 154. The filtering mesh 153 completely isolates the dust sucking port from the air outlet, and the filtered air enters the blower 156 through the air outlet 155.

Typically, the dust sucking port 154 of the dust box 152 is located in front of the automatic cleaning apparatus, the air outlet 155 is located on a side of the dust box 152, and an air sucking port of the blower 156 is docked with the air outlet of the dust box.

A front panel of the dust box 152 may be opened for cleaning garbage within the dust box 152.

The filtering mesh 153 is detachably connected to a body of the dust box 152 to facilitate disassembly, assembly, and cleaning.

Figure 9:
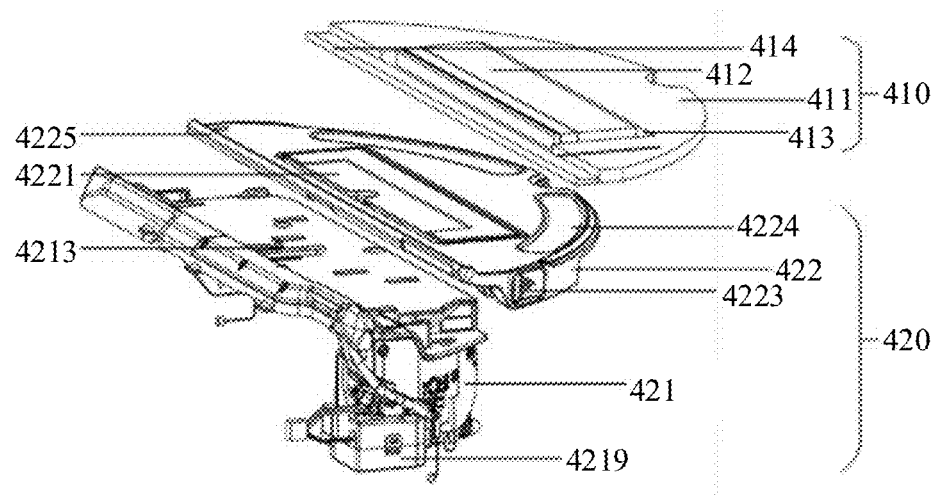
FIG. 9 is an exploded view of an automatic cleaning apparatus according to one embodiment of the present disclosure.
Figure 10:
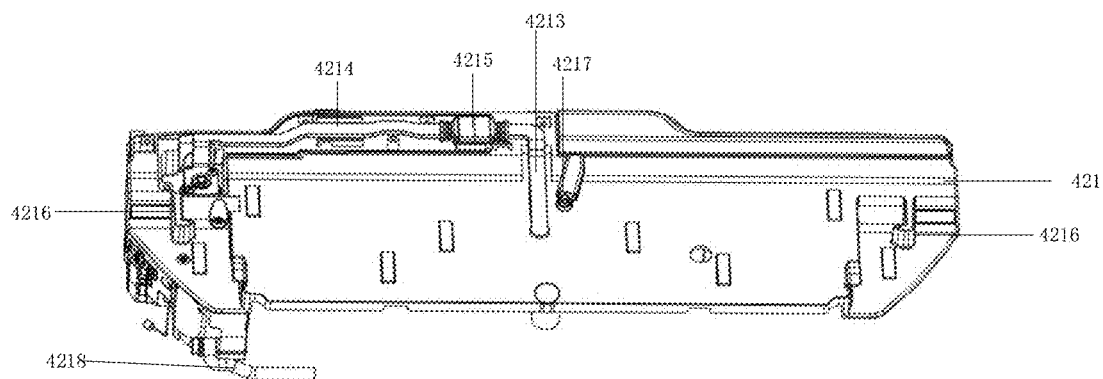
FIG. 10 is a structural diagram of a supporting platform of an automatic cleaning apparatus according to one embodiment of the present disclosure.
Figure 11:
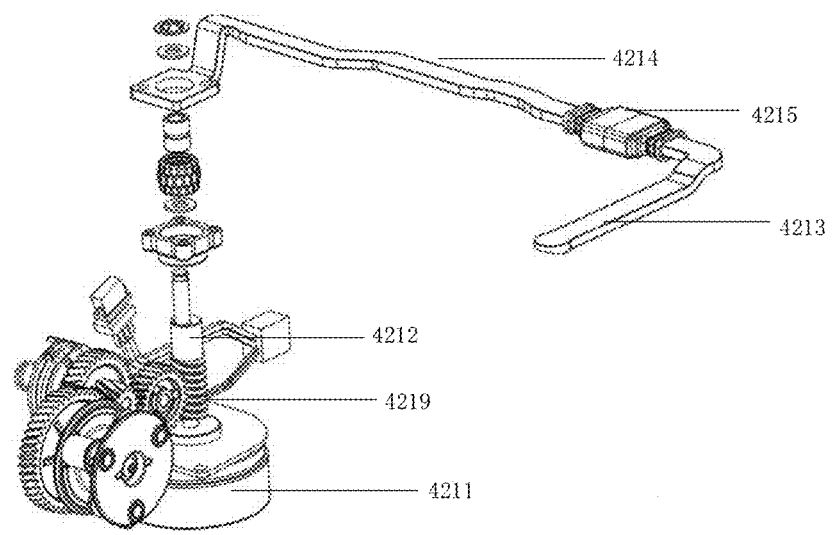
FIG. 11 is a structural diagram of a vibrating member of an automatic cleaning apparatus according to one embodiment of the present disclosure.

As shown in FIGS. 9-11, the wet cleaning module 400 according to the present disclosure is configured to clean at least a part of an operating surface by means of wet cleaning. The wet cleaning module 400 comprises: a cleaning head 410 and a driving unit 420. The cleaning head 410 is used for cleaning at least a part of the operating surface, and the driving unit 420 is used for driving the cleaning head 410 to substantially reciprocate along a target surface, the target surface being a part of the operating surface. The cleaning head 410 reciprocates along a surface to be cleaned, and a surface of the cleaning head 410 in contact with the surface to be cleaned is provided with a cleaning cloth or a cleaning plate, which generates a high-frequency friction with the surface to be cleaned through a reciprocating motion thereof, thereby removing stains on the surface to be cleaned. The reciprocating motion may be a repeated motion along any one or more directions within the operating surface, or may be a vibrating motion perpendicular to the operating surface, which is not strictly limited.

As shown in FIG. 9, the driving unit 420 comprises: a driving platform 421 connected to a bottom surface of the mobile platform 100 for providing a driving force; and a supporting platform 422 detachably connected to the driving platform 421 for supporting the cleaning head 410 and being able to lift and lower under the driving of the driving platform 421.

A lifting module is provided between the cleaning module 150 and the mobile platform 100, so that the cleaning module 150 may better contact the surface to be cleaned, or different cleaning strategies are used for surfaces to be cleaned made of different materials.

The dry cleaning module 151 may be connected to the mobile platform 100 by a passive lifting module. When the cleaning apparatus encounters an obstacle, the dry cleaning module 151 may more easily pass the obstacle by the lifting module.

The wet cleaning module 400 may be connected with the mobile platform 100 by an active lifting module. When the wet cleaning module 400 does not participate in the work temporarily, or when encountering a surface to be cleaned which cannot be cleaned by the wet cleaning module 400, the wet cleaning module 400 is lifted by the active lifting module and separated from the surface to be cleaned, thereby realizing the change of cleaning means.

As shown in FIGS. 10-11, the driving platform 421 comprises: a motor 4211 disposed on a side of the driving platform 421 close to the mobile platform 100 and outputting power by a motor output shaft; a driving wheel 4212 connected to the motor output shaft and having an asymmetric structure; and a vibrating member 4213 which is disposed on a side of the driving platform 421 opposite to the motor 4211 and connected to the driving wheel 4212 and reciprocates under the asymmetrical rotation of the driving wheel 4212.

The driving platform 421 may further comprise a driving wheel and a gear mechanism. The gear mechanism 235 may connect the motor 4211 and the driving wheel 4212. The motor 4211 may directly drive the driving wheel 4212 to swivel, or may indirectly drive the driving wheel 4212 to swivel through the gear mechanism. Those skilled in the art can understand that the gear mechanism may be one gear, or may be a gear set composed of a plurality of gears.

The motor 4211 simultaneously transmits, by a power transmission device, power to the cleaning head 410, the driving platform 421, the supporting platform 422, a water delivery mechanism, a water tank and the like. The energy system 160 provides power and energy for the motor 4211 and is entirely controlled by the control system 130. The power transmission device may be a gear drive, a chain drive, a belt drive, or may be a worm gear or the like.

The motor 4211 has a forward output mode and a reverse output mode. In the forward output mode, the motor 4211 rotates forward, and in the reverse output mode, the motor 4211 rotates reversely. In the forward output mode of the motor 4211, the motor 4211 may simultaneously drive, by the power transmission device, the cleaning head 410 and a water supply mechanism in the wet cleaning module 400 to move synchronously.

Further, the driving platform 421 further includes: a connecting rod 4214 extending along an edge of the driving platform 421 and connecting the driving wheel 4212 and the vibrating member 4213 so that the vibrating member 4213 extends to a preset position. An extending direction of the vibrating member 4213 is perpendicular to the connecting rod 4214.

The motor 4211 is connected to the driving wheel 4212, the vibrating member 4213, the connecting rod 4214 and a vibration buffering device 4215 through the power transmission device. When the wet cleaning assembly 400 is activated, the motor 4211 starts to rotate forward, the motor 4211 drives, through the driving wheel 4212, the connecting rod 4214 to reciprocate along the surface of the driving platform 421, and at the same time, the vibration buffering device 4215 drives the vibrating member 4213 to reciprocate along the surface of the driving platform 421, the vibrating member 4213 drives a cleaning substrate 4221 to reciprocate along the surface of the supporting platform 422, and the cleaning substrate 4221 drives a movable region 412 to reciprocate along the surface to be cleaned. At this point, a clean water pump makes clean water flow out from a clean water tank, and the clean water is sprinkled on the cleaning head 410 through a water discharging device 4217, and the cleaning head 410 reciprocates to clean the surface to be cleaned.

The cleaning intensity/efficiency of the automatic cleaning apparatus may also be automatically and dynamically adjusted according to an operating environment of the automatic cleaning apparatus. For example, the automatic cleaning apparatus may achieve dynamical adjustment according to physical information of the surface to be cleaned detected by the perception system 120. For example, the perception system 120 may detect the flatness of the surface to be cleaned, a material of the surface to be cleaned, whether there is oil and dust, and other information and transmit the information to the control system 130 of the automatic cleaning apparatus. Correspondingly, the control system 130 may instruct the automatic cleaning apparatus to automatically and dynamically adjust a rotational speed of the motor and a transmission ratio of the power transmission device according to the operating environment of the automatic cleaning apparatus, and thus to adjust a preset reciprocating cycle of the reciprocating motion of the cleaning head 410.

For example, when the automatic cleaning apparatus operates on a flat ground, the preset reciprocating period may be automatically and dynamically adjusted to be longer, and a water volume of the water pump may be automatically and dynamically adjusted to be smaller; and when the automatic cleaning apparatus operates on a less flat ground, the preset reciprocating period may be automatically and dynamically adjusted to be shorter, and the water volume of the pump may be automatically and dynamically adjusted to be larger. This is because it is easier to clean the flat ground than the less flat ground, and thus the reciprocating motion of the cleaning head 410 at a higher speed (i.e., higher frequency) and a larger water volume are needed for cleaning an uneven ground.

For another example, when the automatic cleaning apparatus operates on a table, the preset reciprocating period may be automatically and dynamically adjusted to be longer, and the water volume of the water pump may be automatically and dynamically adjusted to be smaller; and when the automatic cleaning apparatus 100 operates on a ground, the preset reciprocating period may be automatically and dynamically adjusted to be shorter, and the water volume of the water pump may be automatically and dynamically adjusted to be larger. This is because the table has less dust and oil compared to the ground, and the material of which the table is made is easier to clean, and thus only a fewer number of reciprocating motions of the cleaning head 410 and a relatively smaller water volume of the water pump are needed for cleaning the table.

The supporting platform 422 includes the cleaning substrate 4221 disposed movably on the supporting platform 422. The cleaning substrate 4221 substantially reciprocates under the vibration of the vibrating member 4213. Optionally, the cleaning substrate 4221 includes: an assembling notch (not shown) disposed at a position in contact with the vibrating member 4213. When the supporting platform 422 is connected to the driving platform 421, the vibrating member 4213 is assembled to the assembling notch 42211, so that the cleaning substrate 4221 may reciprocate synchronously with the vibrating member 4213.

Figure 12:
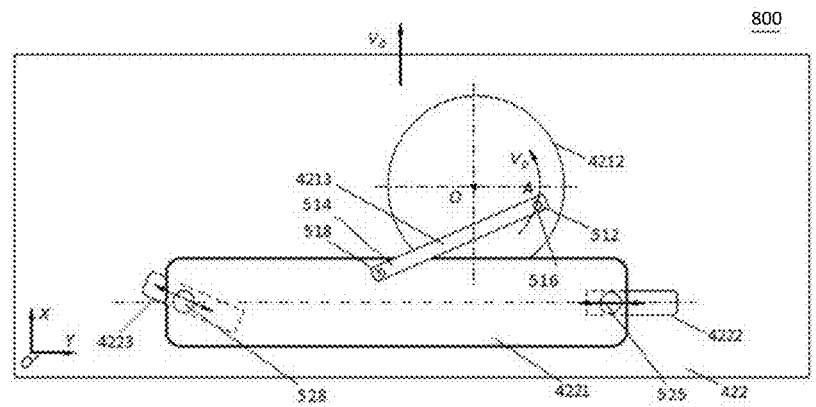
FIG. 12 is a schematic diagram of a cleaning head driving mechanism based on a crank-slider mechanism according to another embodiment of the present disclosure.

FIG. 12 shows another driving mechanism 800 of a cleaning head based on a crank slider mechanism according to various embodiments of the present application. The driving mechanism 800 may be applied to the driving platform 421. The driving mechanism 800 comprises a driving wheel 4212, a vibrating member 4213, a cleaning substrate 4221, a sliding slot 4222 (a first sliding slot) and a sliding slot 4223 (a second sliding slot).

The sliding slots 4222 and 4223 are formed in the supporting platform 422. Both ends of the cleaning substrate 4221 include a slider 525 (a first slider) and a slider 528 (a second slider), respectively. Each of the sliders 525 and 528 is a protrusion at each of both ends of the cleaning substrate 4221. The slider 525 is inserted within the sliding slot 4222 and may slide along the sliding slot 4222; and the slider 528 is inserted within the sliding slot 4223 and may slide along the sliding slot 4223. In some embodiments, the sliding slot 4222 and the sliding slot 4223 are on the same line. In some embodiments, the sliding slot 4222 and the sliding slot 4223 are not on the same line. In some embodiments, the sliding slot 4222 and the sliding slot 4223 extend in the same direction. In some embodiments, an extending direction of the sliding slot 4222 and an extending direction of the sliding slot 4223 are the same as that of the cleaning substrate 4221. In some embodiments, the extending direction of the sliding slot 4222 and the extending direction of the sliding slots 4223 are different from that of the cleaning substrate 4221. In some embodiments, the extending direction of the sliding slot 4222 is different from the extending direction of the sliding slot 4223. For example, as shown in FIG. 12, the extending direction of the sliding slot 4222 is the same as that of the cleaning substrate 4221, and the extending direction of the sliding slot 4223 is angled relative to that of the sliding slot 4222.

The vibrating member 4213 comprises a swiveling end 512 and a sliding end 514. The swiveling end 512 is connected to the driving wheel 4212 through a first pivot 516, and the sliding end 514 is connected to the cleaning substrate 4221 through a second pivot 518.

A swiveling center of the driving wheel 4212 is a point O, and a pivoting center of the first pivot 516 is a point A. The point O and the point A do not coincide, and the distance between the point O and the point A is a preset distance d.

When the driving wheel 4212 rotates, the point A also swivels along a circular path. Correspondingly, the swiveling end 512 follows the point A to swivel along a circular path; and the sliding end 514 drives the cleaning substrate 4221 to slide through the second pivot 518. Correspondingly, the slider 525 of the cleaning substrate 4221 reciprocates linearly along the sliding slot 4222, and the slider 528 of the cleaning substrate 4221 reciprocates linearly along the sliding slot 4223. In FIG. 4, a moving speed of the mobile platform 210 is VO, and a moving direction thereof is the target direction. According to some embodiments, when the sliding slot 4223 and the sliding slot 4222 are respectively approximately perpendicular to the direction of the moving speed VO of the mobile platform 210, an overall displacement of the cleaning substrate 4221 is substantially perpendicular to the target direction. According to some other embodiments, when any one of the sliding slot 4223 and the sliding slot 4222 forms an angle other than 90 degrees with the target direction, the overall displacement of the cleaning substrate 4221 includes both a component perpendicular to the target direction and a component parallel to the target direction.

Further, a vibration buffering device 4215 is included, which is disposed on the connecting rod 4214 for reducing vibration in a specific direction. In this embodiment, the vibration buffering device 4215 is used for reducing vibration in the direction of the moving component perpendicular to the target direction of the automatic cleaning apparatus.

Figure 13:
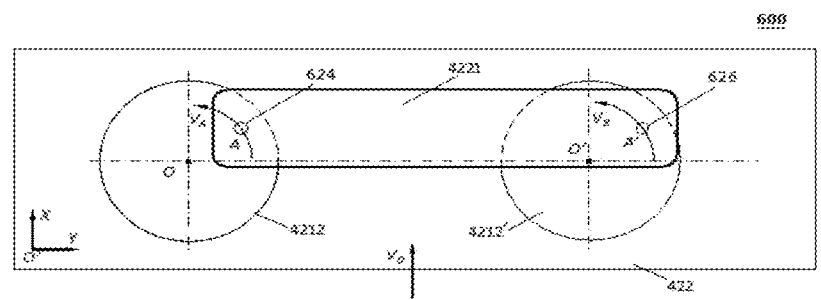
FIG. 13 is a schematic diagram of a cleaning head driving mechanism based on a double-crank mechanism according to another embodiment of the present disclosure.

FIG. 13 shows another driving mechanism 600 of a cleaning head based on a double-crank mechanism according to various embodiments of the present application. The driving mechanism 600 may be applied to the driving platform 421. The driving mechanism 600 comprises a driving wheel 4212 (a first driving wheel), a driving wheel 4212' (a second driving wheel), and a cleaning substrate 4221.

The cleaning substrate 4221 has two ends, a first end thereof is connected to the driving wheel 4212 through a pivot 624 (a first pivot); and a second end thereof is connected to the driving wheel 4212' through a pivot 626 (a second pivot). A swiveling center of the driving wheel 4212 is a point O, and a pivoting center of the pivot 624 is a point A. The point O and the point A do not coincide, and the distance between the point O and the point A is a preset distance d. A swiveling center of the driving wheel 4212 is a point O', and a pivoting center of the pivot 626 is point A'. The point O' and the point A' do not coincide, and the distance between the point O' and the point A' is a preset distance d. In some embodiments, the point A, the point A', the point O, and the point O' are on the same plane. Therefore, the driving wheel 4212, the driving wheel 4212' and the cleaning substrate 4221 may form a double-crank mechanism (or a parallelogram mechanism), where the cleaning substrate 4221 acts as a coupling lever, and the driving wheels 4212 and 4212' act as two cranks.

Further, a vibration buffering device 4215 is described, which is disposed on the connecting rod 4214 for reducing vibration in a specific direction. In this embodiment, the vibration buffering device 4215 is used for reducing vibration in the direction of the moving component perpendicular to the target direction of the automatic cleaning apparatus.

Figure 14:
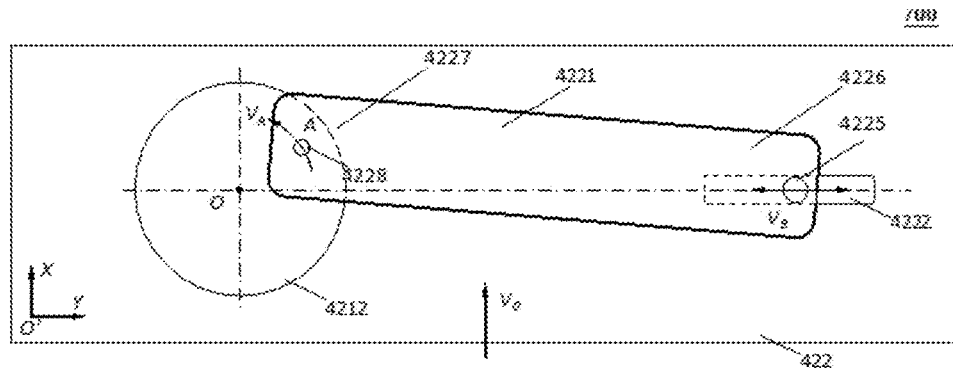
FIG. 14 is a schematic diagram of a cleaning head driving mechanism based on a crank mechanism according to another embodiment of the present disclosure.

FIG. 14 shows a driving mechanism 700 based on a crank slider mechanism according to various embodiments of the present application. The driving mechanism 700 may be applied to the driving platform 421. The driving mechanism 700 comprises a driving wheel 4212, a cleaning substrate 4221, and a sliding slot 4222.

The sliding slot 4222 is formed in the supporting platform 422. The cleaning substrate 4221 comprises a swiveling end 4227 and a sliding end 4226. The swiveling end 4227 is connected to the driving wheel 4212 through a pivot 4228. A swiveling center of the driving wheel 4212 is a point O, and a pivoting center of the pivot 4228 of the swiveling end is a point A. The point O and the point A do not coincide, and the distance between the point O and the point A is a preset distance d. The sliding end 4226 comprises a slider 4225. The slider 4225 is a protrusion on the sliding end 4226. The slider 4225 is inserted within the sliding slot 4222 and may slide along the sliding slot 4222. Therefore, the driving wheel 4221, the cleaning substrate 4221, the slider 4225, and the sliding slot 4222 constitute the crank slider mechanism.

When the driving wheel 4212 rotates, the point A swivels along a circular path. Correspondingly, the swiveling end 4227 of the cleaning substrate 4221 follows the point A to swivel along a circular path; and the slider 4225 also slides in the sliding slot 4222 to reciprocate linearly. As a result, the cleaning substrate 4221 starts to reciprocate. According to some embodiments, the sliding slot 4222 is approximately perpendicular to the target direction of a moving speed of the mobile platform. Therefore, the linear motion of the sliding end 4226 includes a component perpendicular to the target direction, and the circular swiveling motion of the swiveling end 4227 comprises both a component perpendicular to the target direction and a component parallel to the target direction.

In FIG. 14, the moving speed of the mobile platform is VO, and a moving direction thereof is the target direction; and the sliding slot 4222 is approximately perpendicular to the target direction. At this point, the entire reciprocating motion of the cleaning substrate 4221 includes both a movement component parallel to the target direction of the automatic cleaning apparatus and a movement component perpendicular to the target direction of the automatic cleaning apparatus.

Further, a vibration buffering device 4215 is described, which is disposed on the connecting rod 4214 for reducing vibration in a specific direction. In this embodiment, the vibration buffering device 4215 is used for reducing vibration in the direction of the moving component perpendicular to the target direction of the automatic cleaning apparatus.

Further, the supporting platform 422 further comprises: an elastic detaching button 4229 disposed on at least one side of the supporting platform 422 for detachably connecting the supporting platform 422 to a pawl 4216 of the driving platform 421. At least one assembling region 4224 disposed on the supporting platform 422 for assembling the cleaning head 410. The assembling region 4224 may be formed of an adhesive material with an adhesive layer.

As shown in FIG. 9, the cleaning head 410 comprises a movable region 412 connected to the cleaning substrate 4221 and reciprocating along a surface to be cleaned under the driving of the cleaning substrate 4221. The movable region 412 is disposed at a substantially central position of the cleaning head 410.

A side of the movable region 412 connected to the cleaning substrate 4221 is provided with an adhesive layer, and the movable region 412 is connected to the cleaning substrate 4221 through the adhesive layer.

Optionally, the cleaning head 410 further comprises: a fixed region 411 connected to a bottom of the supporting platform 422 through the at least one assembling region 4224. The fixed region 411 cleans at least a part of the operating surface along with the movement of the supporting platform 422.

Further, the cleaning head 410 further comprises: a flexible connecting portion 413 disposed between the fixed region 411 and the movable region 412 for connecting the fixed region 411 and the movable region 412. The cleaning head 410 further comprises: a sliding buckle 414 extending along an edge of the cleaning head 410 and detachably mounted at an engagement position 4225 of the supporting platform 422.

As shown in FIG. 9, the cleaning head 410 may be made of a material having a certain elasticity, and the cleaning head 410 is fixed on the surface of the supporting platform 422 through an adhesive layer so as to reciprocate. When operating, the cleaning head 410 is always in contact with the surface to be cleaned.

The water delivery mechanism comprises a water discharging device 4217. The water discharging device 4217 may be directly or indirectly connected with a cleaning liquid outlet of a water tank (not shown), that is, a liquid discharging port of the clean water tank. A cleaning liquid may flow toward the water discharging device 4217 via the cleaning liquid outlet of the water tank, and may be evenly coated on the surface to be cleaned through the water discharging device. A connecting member (not shown in the figures) may be provided on the water discharging device, and the water discharging device is connected to the cleaning liquid outlet of the water tank through the connecting member. The water discharging device is provided with a distributing port. The distributing port may be a continuous opening, or a combination of several discontinuous small openings. Several nozzles may be provided at the distributing port. The cleaning liquid flows toward the distributing port via the cleaning liquid outlet of the water tank and the connecting member of the water discharging device, and is evenly coated on the operating surface via the distributing port.

The water delivery mechanism may also comprise a clean water pump 4219 and/or a clean water pump pipe 4218. The clean water pump 4219 may be communicated with the cleaning liquid outlet of the water tank directly or communicated with the cleaning liquid outlet of the water tank through the clean water pump pipe 4218.

The clean water pump 4219 may be connected to the connecting member of the water discharging device, and may be configured to pump the cleaning fluid from the water tank to the water discharging device. The clean water pump may be a gear pump, a vane pump, a plunger pump, a peristaltic pump, and the like.

The water delivery mechanism draws the cleaning liquid out of the clean water tank through the clean water pump 4219 and the clean water pump pipe 4218, and transports the cleaning liquid to the water discharging device. The water discharging device 4217 may be a sprinkler head, a drip hole, a wet cloth, and the like, and may spread water evenly on the cleaning head so as to wet the cleaning head and the surface to be cleaned. Stains on the wetted surface to be cleaned may be cleaned more easily. In the wet cleaning assembly 400, the power/flow rate of the clean water pump may be adjusted.

The driving unit and a vibrating region are added to the wet cleaning module, and thus the cleaning head may reciprocate so as to repeatedly clean the surface to be cleaned. Therefore, in the movement trajectory of a cleaning robot, a region may be cleaned several times when the cleaning robot passes through the region just one time, thereby greatly enhancing the cleaning effect, especially for regions with more stains, the cleaning effect is readily apparent.

Figure 15:
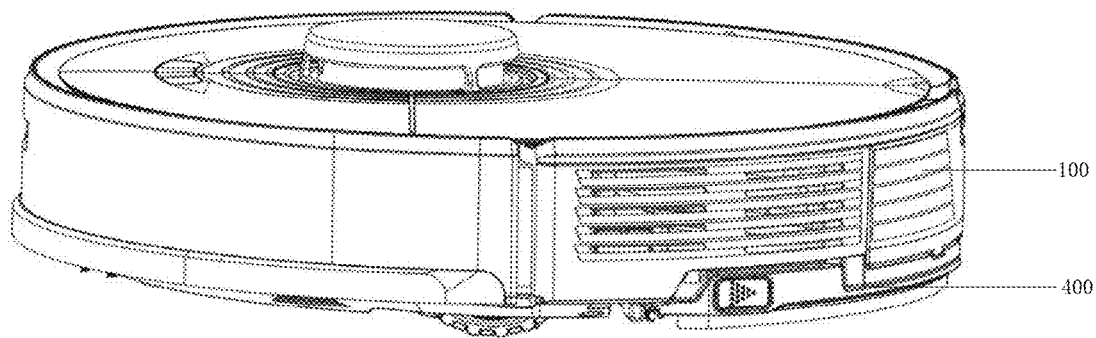
FIG. 15 is a schematic diagram of an automatic cleaning apparatus in a lifted state according to one embodiment of the present disclosure.
Figure 16:
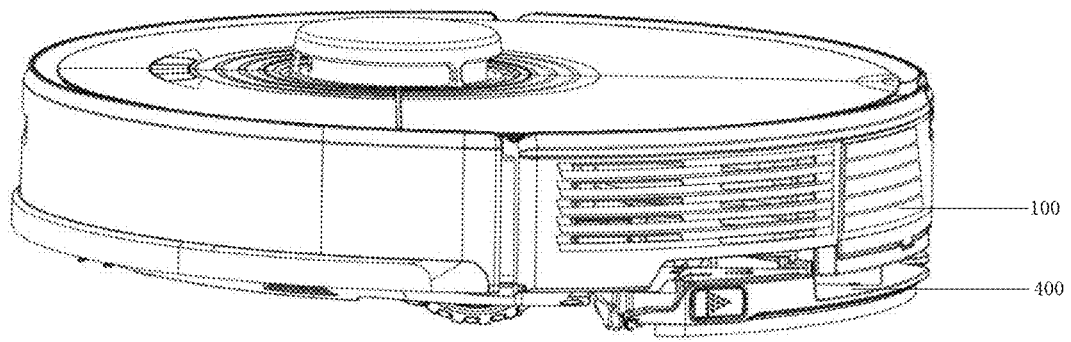
FIG. 16 is a schematic diagram of an automatic cleaning apparatus in a lowered state according to one embodiment of the present disclosure.

According to a specific embodiment of the present disclosure, a liftable automatic cleaning device is provided. The liftable automatic cleaning device includes: a mobile platform 100 configured to move automatically on an operation surface, and a wet cleaning module 400. The wet cleaning module 400 is movably connected to the mobile platform 100 through a four-link lifting structure 500, and is configured to clean at least a part of the operating surface by means of wet cleaning. The four-link lifting structure 500 is a parallelogram structure and used to switch the wet cleaning module 400 between a lifting state and a lowering state. The lifting state is a state in which the wet cleaning module 400 leaves the operating surface, as shown in FIG. 15; and the lowering state is a state in which the wet cleaning module 400 is attached to the operating surface, as shown in FIG. 16.

Figure 17:
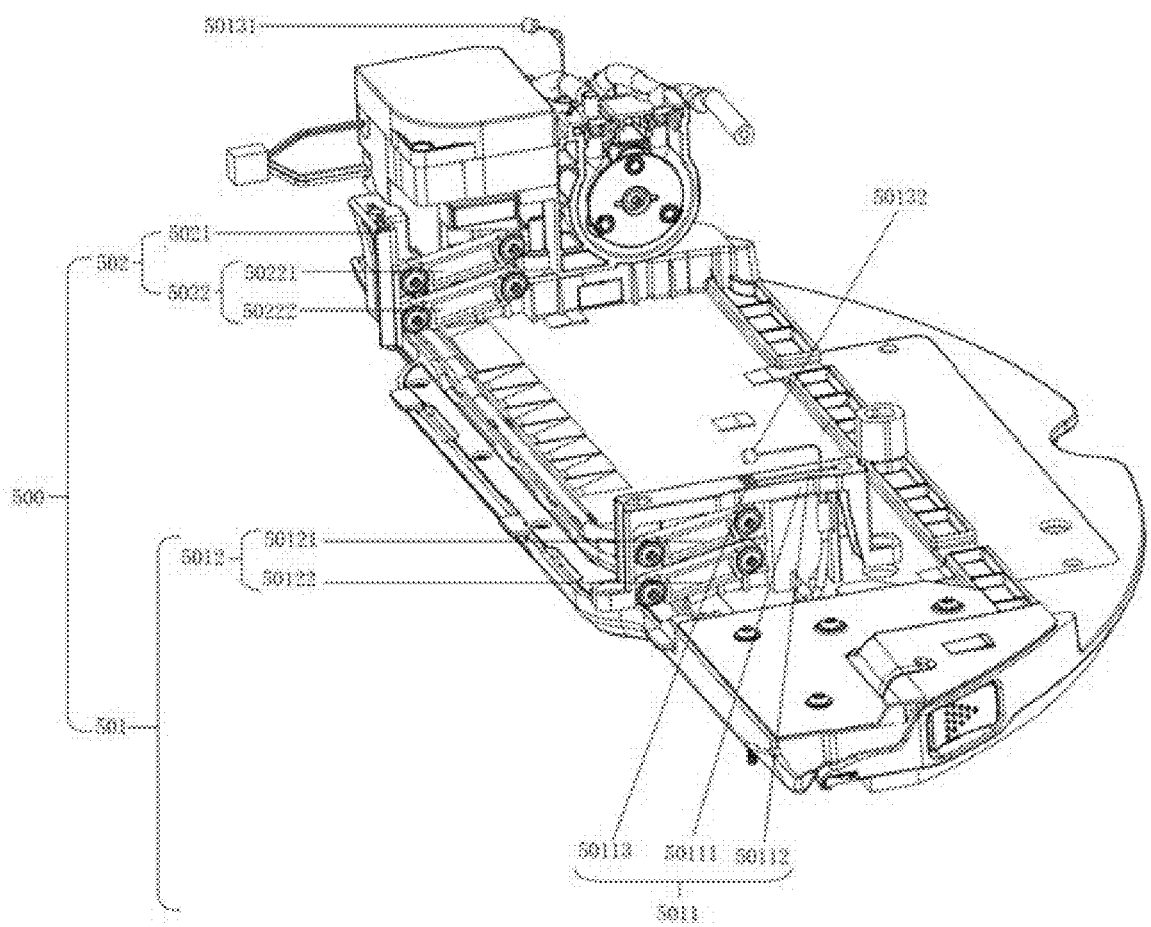
FIG. 17 is a schematic diagram of a four-link lifting structure in a lifted state according to one embodiment of the present disclosure.
Figure 18:
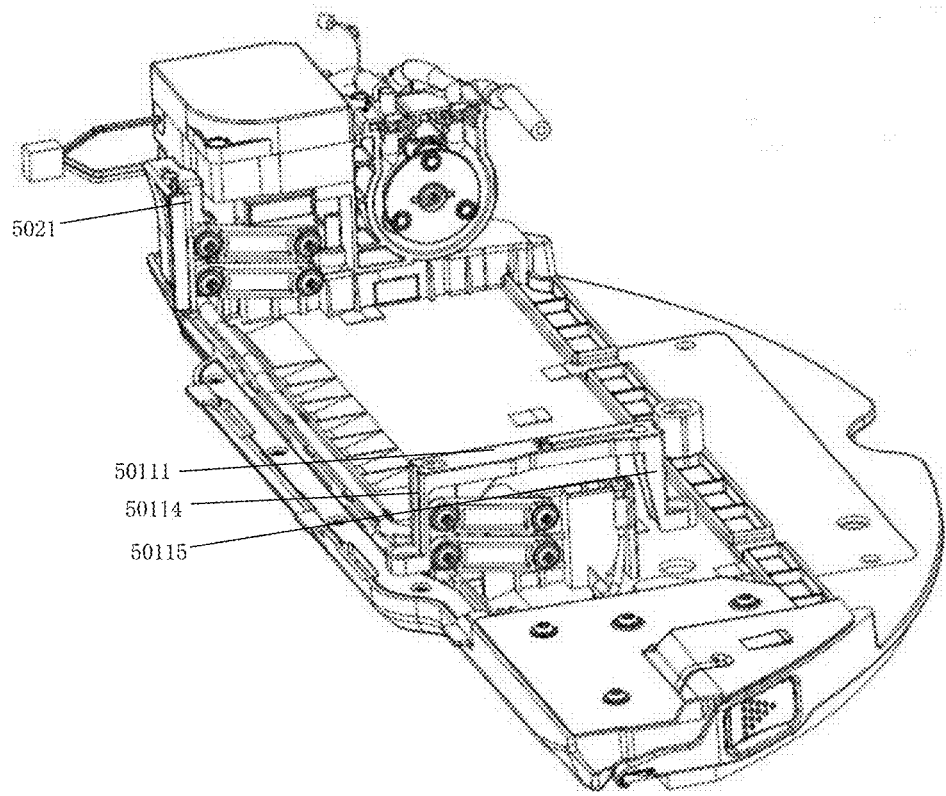
FIG. 18 is a schematic diagram of a four-link lifting structure in a lowered state according to one embodiment of the present disclosure.

As shown in FIGS. 17-18, the four-link lifting structure 500 comprises: a first connecting end 501 which can provide active power to switch the wet cleaning module 400 between the lifting state and the lowering state; and a second connecting end 502 which is disposed opposite to the first connecting end 501 and which is rotated under the action of the active power. The first connecting end 501 and the second connecting end 502 are located at two sides of the wet cleaning module 400, respectively, and the wet cleaning module 400 is lifted or lowered by stably providing a lifting force or a lowering force.

Specifically, the first connecting end 501 comprises a first bracket 5011 fixedly connected to a bottom of the mobile platform 100. The first bracket 5011 is roughly shaped like a Chinese character "儿", and the first bracket 5011 includes: a cross beam 50111, a first longitudinal beam 50114 and a second longitudinal beam 50115. A tail end of each of the first longitudinal beam 50114 and the second longitudinal beam 50115 is fixedly connected to the mobile platform 100 and the wet cleaning module 400 through a bolt, so as to provide a supporting force when the wet cleaning module 400 is lifted and lowered.

The first connecting end 501 further includes a first connecting rod pair 5012. One end of the first connecting rod pair 5012 is rotatably connected to the first bracket 5011, and the other end thereof is rotatably connected to the wet cleaning module 400. The first connecting rod pair 5012 may be of a hollowed-out structure, which can reduce overall weight of lifting ends and lowering ends.

Optionally, the first connecting rod pair 5012 comprises a first connecting rod 50121 and a second connecting rod 50122 which are arranged in parallel. A first end of each of the first connecting rod 50121 and the second connecting rod 50122 is rotatably connected to the first longitudinal beam 50114 through a movable stud, and a second end of each of the first connecting rod 50121 and the second connecting rod 50122 is rotatably connected to the wet cleaning module 400 through a movable stud. For example, each of two ends of each of the first connecting rod 50121 and the second connecting rod 50122 is provided with a through hole having a diameter larger than that of the movable stud, so that the movable stud may rotate freely within the through hole, and the movable stud is fixedly connected to the first longitudinal beam 50114 through the through hole. When the motor 50131 provides a pulling force to the second end through the cable, the first ends of the first connecting rod 50121 and the second connecting rod 50122 simultaneously rotate around the movable studs at the first ends, and the second ends thereof are lifted under the pulling force of the cable, so that the wet cleaning module 400 is lifted. When the motor 4211 releases the pulling force to the second end through the cable, the first ends of the first connecting rod 50121 and the second connecting rod 50122 simultaneously reversely rotate around the movable studs at the first ends, and the second ends thereof are lowered under the action of gravity, so that the wet cleaning module 400 is lowered.

The first connecting end 501 further includes a power component 5013 for providing a pulling force to rotate the first connecting rod pair 5012 within a preset angle. The power component 5013 includes a motor 50131 for providing a driving force for forward and reverse rotation, and a cable 50132. One end of the cable 50132 is connected to the motor 50131, for example, wound on and connected to a gear connected to a motor output shaft, for realizing telescopic movement under rotation of the motor. The other end of the cable 50132 is connected to second ends of the first connecting rod 50121 and the second connecting rod 50122. The motor 50131 causes the second ends of the first connecting rod 50121 and the second connecting rod 50122 to be lifted or lowered through the cable 50132.

Optionally, the first bracket 5011 further comprises: a sliding slot 50112 extending along a surface of the cross beam 50111; and a through hole 50113 running through the cross beam 50111 and disposed at an extended end of the sliding slot 50112. The cable 50132 is connected to the second ends of the first connecting rod 50121 and the second connecting rod 50122 through the sliding slot 50112 and the through hole 50113. The sliding slot 50112 may restrict a movement direction of the cable, thereby ensuring the stability during lifting the module, and the width of the sliding slot should be matched with the thickness of the cable.

As shown in FIG. 17, the second connecting end 502 comprises: a second bracket 5021 fixedly connected to a bottom of the mobile platform 100; and a second connecting rod pair 5022, one end of which is rotatably connected to the second bracket 5021, and the other end of which is rotatably connected to the wet cleaning module 400. The second connecting rod pair 5022 rotates with the rotation of the first connecting rod pair 5012. The second connecting rod pair 5022 may be of a hollowed-out structure, which can reduce overall weight of lifting ends.

Specifically, the second connecting rod pair 5022 comprises a third connecting rod 50221 and a fourth connecting rod 50222 which are arranged in parallel. A first end of each of the third connecting rod 50221 and the fourth connecting rod 50222 is rotatably connected to the second bracket 5021 through a movable stud, and a second end of each of the third connecting rod 50221 and the fourth connecting rod 50222 is rotatably connected to the wet cleaning module 400 through a movable stud. For example, each of two ends of each of the third connecting rod 50221 and the fourth connecting rod 50222 is provided with a through hole having a diameter larger than that of the movable stud, so that the movable stud may rotate freely within the through hole, and the movable stud is fixedly connected to the second bracket 5021 through the through hole. When the first connecting end 501 rotates under the driving of the motor 50131, the first ends of the third connecting rod 50221 and the fourth connecting rod 50222 simultaneously rotate around the movable studs at the first ends, and the second ends of the third connecting rod 50221 and the fourth connecting rod 50222 simultaneously rotate around the movable studs at the second ends, so that the wet cleaning module 400 is lifted. When the pulling force to the first connecting end 501 is released, the first ends of the third connecting rod 50221 and the fourth connecting rod 50222 simultaneously reversely rotate around the movable studs at the first ends, and the second ends thereof are lowered under the action of gravity, so that the wet cleaning module 400 is lowered.

By means of the four-link lifting structure disposed between the wet cleaning module and the mobile platform, the wet cleaning module may be lifted and lowered relative to the mobile platform. When a mopping task is performed, the wet cleaning module is lowered, so that the wet cleaning module is in contact with the ground, and when the mopping task is completed, the wet cleaning module is lifted, so that the wet cleaning module is separated from the ground, thereby avoiding the increased resistance due to the existence of the cleaning module when the cleaning apparatus moves freely on the surface to be cleaned.

In cooperation with a surface medium sensor and other sensors that may detect a surface type of the surface to be cleaned, the lifting module enables the wet cleaning module to perform a cleaning operation according to different surfaces to be cleaned. For example, the lifting module lifts the wet cleaning module in case of a carpet surface, and lowers the wet cleaning module in case of a floor surface, a floor tile surface or the like, for cleaning. Thus, a more comprehensive cleaning effect is achieved.

With the development of sweeping robots, an existing sweeping robot has developed into a cleaning robot that integrates dry cleaning and wet cleaning. In a cleaning robot 2000 shown in FIG. 1, both a dry cleaning module 151 and a wet cleaning module 400 are installed. In a cleaning process, the dry cleaning module 151 is at the front end of a traveling direction to clean a ground; and the wet cleaning module 400 is at the rear end of the traveling direction, and can mop and clean the ground after the dry cleaning module 151 cleans the ground. However, generally, the wet cleaning module 400 cannot be used for cleaning a carpet.

In actual application, to prevent the wet cleaning module 400 from wetting the carpet, the cleaning robot 2000 is usually provided with a wet cleaning module lifting mechanism. Therefore, when the surface medium sensor 103 of the cleaning robot 2000 recognizes the carpet, the wet cleaning module can be lifted, so that when the cleaning robot 2000 passes over the carpet, the wet cleaning module is not in contact with the carpet. When it is detected that the cleaning robot leaves the carpet, the wet cleaning module 400 can be lowered to mop and clean the ground.

However, due to a limitation to the height of the cleaning robot 2000, a liftable range of the wet cleaning module 400 is very limited, usually only about 1 mm. For a long-pile carpet, a mat, clothing, or the like, even if the wet cleaning module 400 is lifted, it is difficult to avoid wetting the above items, and the cleaning robot 2000 is even stuck and unable to move.

Based on this, an exemplary embodiment of the present disclosure provides an escaping method of a cleaning robot, used in a case that the cleaning robot is trapped by the carpet after completing a wall-following task. The above case is described with reference to FIGS. 19-24.

Figure 19:
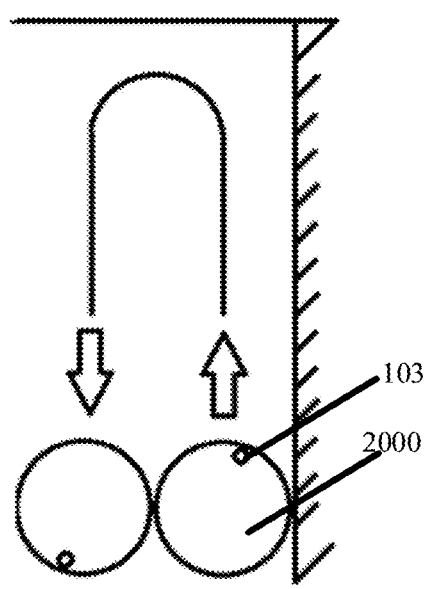
FIG. 19 shows a route of a cleaning robot when cleaning along a wall according to one embodiment of the present disclosure.

As shown in FIG. 19, when the cleaning robot 2000 cleans, along a wall, a ground without a carpet, or cleans a ground at a corner of a wall and away from a carpet, the cleaning robot 2000 can sense a distance between a robot body and the wall through a side distance sensor, keep the distance between the robot body and the wall constant, travel forward along an edge of the wall, and use a front side brush 157 of the cleaning robot 2000 to sweep dust on the edge of the wall into a main brush of the robot body. In addition, the cleaning robot can selectively use the wet cleaning module 400 to mop and clean the ground. After completing the task of cleaning along the wall, the cleaning robot 2000 turns around automatically and continues cleaning the ground, as shown in FIG. 19.

Figure 20:
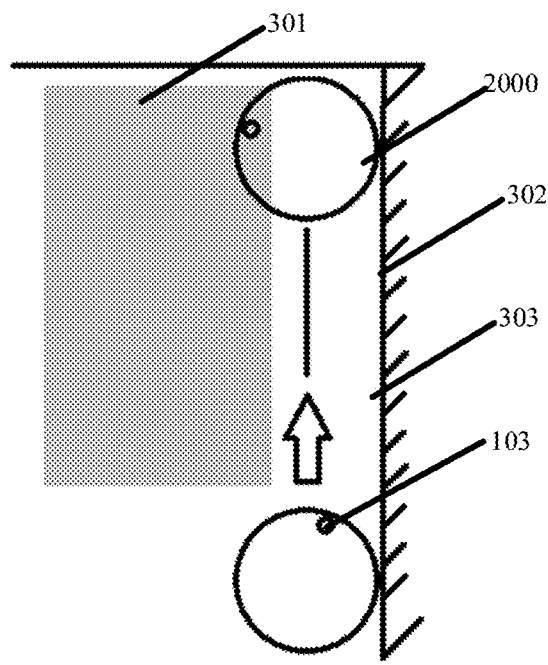
FIG. 20 is a schematic structural diagram of a cleaning robot which is stuck when cleaning along a wall according to one embodiment of the present disclosure.

However, when the cleaning robot 2000 turns around after cleaning along the wall and detects the carpet 301, that is, when there is a narrow gap 303 between the carpet 301 and the wall 302, as shown in FIG. 20, because the surface medium sensor 103 is on one side of the side brush 157 when the cleaning robot 2000 enters the narrow gap 303, that is, the surface medium sensor 103 has not detected the carpet 301, the surface medium sensor 103 is not triggered at that time. When the cleaning robot 2000 turns around to return after encountering an obstacle or completing cleaning along the wall, the surface medium sensor 103 is triggered. If the narrow gap 303 is not wide enough for the cleaning robot 2000 to turn around, the cleaning robot 2000 may be stuck and cannot come out, causing troubles to a user.

Figure 21:
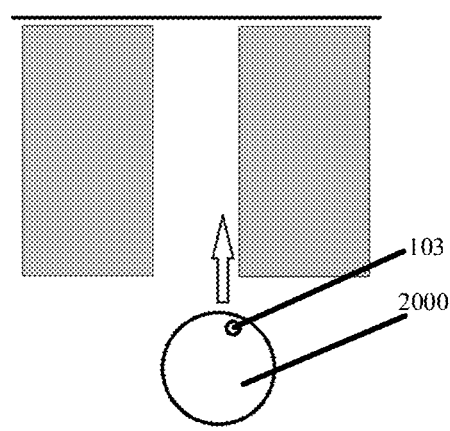
FIG. 21 shows a first schematic route of a cleaning robot when cleaning along a carpet edge according to one embodiment of the present disclosure.
Figure 22:
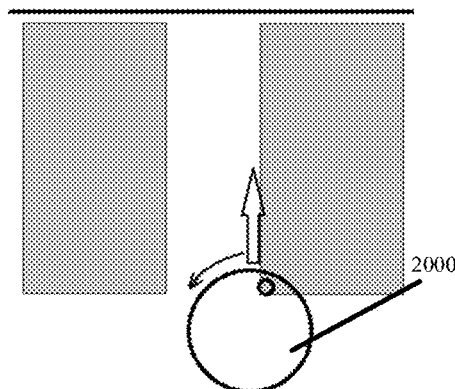
FIG. 22 shows a second schematic route of a cleaning robot when cleaning along a carpet edge according to one embodiment of the present disclosure.
Figure 23:
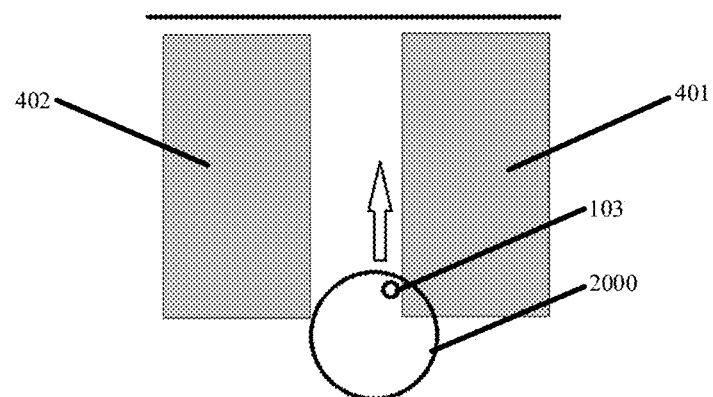
FIG. 23 shows a third schematic route of a cleaning robot when cleaning along a carpet edge according to one embodiment of the present disclosure.

In addition, as shown in FIG. 21, if the cleaning robot 2000 has detected a carpet before cleaning along an edge of the carpet, the cleaning robot 2000 controls the robot body to rotate at a certain angle, for example, rotate 15 degrees counterclockwise as shown in FIG. 22. Then, the cleaning robot 2000 travels forward for a short distance in a direction of this angle. After traveling forward for the short distance, the cleaning robot 2000 turns around to the previous angle, and continues to travel forward along a turned direction, while detecting whether there is a carpet. If the carpet can still be detected, the cleaning robot needs to further rotate at a certain angle and repeat the above process until the carpet cannot be detected. At this time, a mode of cleaning along the edge of the carpet is enabled, as shown in FIG. 23.

In actual application, a specific rotation direction and angle as well as the length of the short distance for forward traveling may be specified according to actual conditions, which is not limited in this exemplary embodiment.

Figure 24:
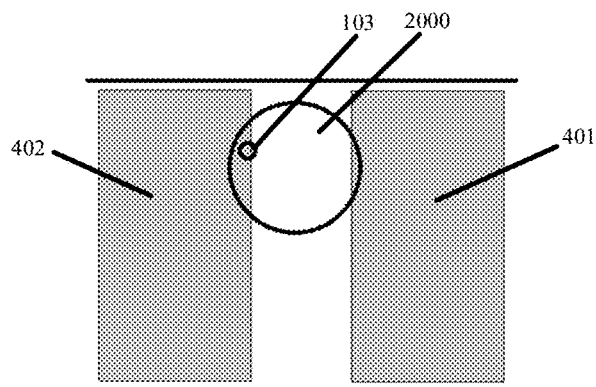
FIG. 24 is a schematic diagram of a cleaning robot which is stuck when cleaning along a carpet edge according to one embodiment of the present disclosure.

The cleaning robot 2000 turns around after completing cleaning along the edge of the carpet, for example, after completing cleaning along an edge of a first carpet 401, as shown in FIG. 24. However, another carpet may be detected in the turning process, namely, the second carpet 402 in FIG. 24. If a gap between the first carpet 401 and the second carpet 402 is relatively narrow, because a carpet recognition apparatus 103 is disposed on one side of the first carpet 401 and has not detected the second carpet 402, the carpet recognition apparatus 103 is not triggered when the cleaning robot 2000 enters the gap. When the cleaning robot 2000 turns around to return after completing cleaning along the edge of the first carpet 401, the carpet recognition apparatus 103 is triggered. If the gap is not wide enough for the cleaning robot 2000 to turn around, the cleaning robot 2000 may be stuck and cannot come out, causing troubles to the user.

Figure 25:
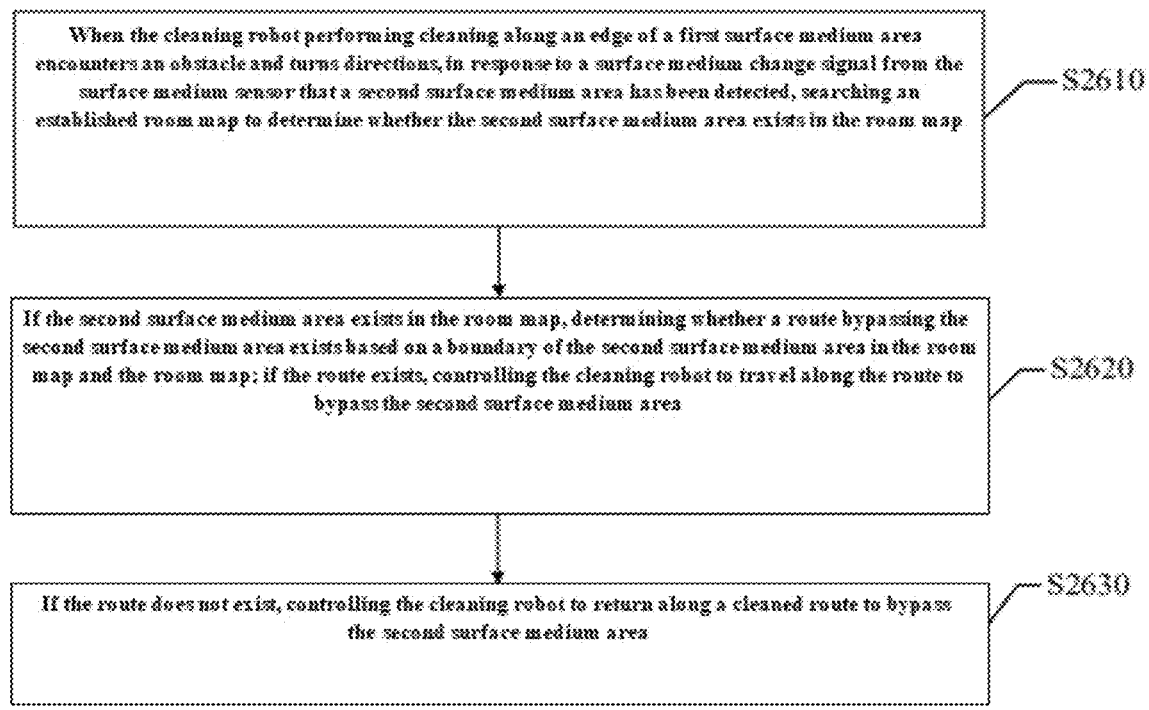
FIG. 25 is a flow chart of an escaping method of a cleaning robot according to one embodiment of the present disclosure.

In view of the above case, referring to FIG. 25, which shows a flow chart of an escaping method of a cleaning robot according to one embodiment of the present disclosure, the escaping method of a cleaning robot may include the following steps:

step S2610, when the cleaning robot encounters an obstacle and turns around while performing cleaning along an edge of a first surface medium area, in response to a surface medium change signal from the surface medium sensor indicates that a second surface medium area is detected, searching an established room map to determine whether the second surface medium area exists in the room map;

step S2620, if the second surface medium area exists in the room map, determining whether a route bypassing the second surface medium area exists based on the room map and a boundary of the second surface medium area in the room map; if the route exists, controlling the cleaning robot to travel along the route to bypass the second surface medium area; and step S2630, if the route does not exist, controlling the cleaning robot to return along a cleaned route to bypass the second surface medium area.

According to the escaping method of a cleaning robot provided in this exemplary embodiment of the present disclosure, when the cleaning robot encounters an obstacle while cleaning along the edge of the first surface medium area such as a wall, and prepares to turn around and continue cleaning the ground, the surface medium sensor is triggered and detects that a surface medium changes, so that the second surface medium area such as a carpet is recognized. In this case, searching may be performed based on a pre-established room map first to determine whether the second surface medium area exists in the room map. If the second surface medium area exists in the room map, whether a route bypassing the second surface medium area exists may be determined based on the room map and a boundary of the second surface medium area in the room map, thereby helping the cleaning robot to escape. In other words, if the route bypassing the second surface medium area exists, the cleaning robot is controlled to travel along the route, thereby bypassing the carpet and coming out from the gap between the wall and the carpet. However, if the route bypassing the second surface medium area does not exist, the cleaning robot is controlled to return along a cleaned route to bypass the carpet.

The escaping method of a cleaning robot provided in this exemplary embodiment of the present disclosure is a method for enabling a cleaning robot to escape when turning around after completing cleaning of the narrow gap between the carpet and the wall, thereby avoiding a case that the cleaning robot is stuck. This improves the automatic escaping capability of the cleaning robot, and decreases a failure rate of the cleaning robot, thereby improving users' experience.

It should be noted that the above escaping method of a cleaning robot is applicable when the cleaning robot is in a mode in which cleaning a carpet is skipped or a mode in which the wet cleaning module is enabled. In these two modes, the cleaning robot cannot get on a carpet, that is, the cleaning robot is in a mode in which only the first surface medium area is to be cleaned. Therefore, when trapped by a carpet, the cleaning robot can be controlled to escape without getting on the carpet according to the escaping method of a cleaning robot provided in this exemplary embodiment of the present disclosure, thereby reducing the probability that the cleaning robot is trapped by a carpet.

In addition, a first surface medium herein is one or more of floor surface media such as a wooden floor, a carpet, a ceramic floor, and a cement surface; and a second surface medium is one or more of floor surface media such as a wooden floor, a carpet, a ceramic floor, and a cement surface and is different from the first surface medium.

In an exemplary embodiment of the present disclosure, after the cleaning robot cleans along the edge of the first surface medium area, turns around, and detects the second surface medium area, it is also necessary to recheck, by using another sensor, whether at least a part of the robot body of the cleaning robot has entered the second surface medium area. If a recheck result also shows that at least a part of the robot body of the cleaning robot has entered the second surface medium area, the cleaning robot needs to be controlled to travel in an opposite direction to leave the second surface medium area first, so as to prevent the cleaning robot from continuing traveling on the second surface medium area to wet the carpet or damage the cleaning robot.

By controlling the cleaning robot to travel in an opposite direction, the cleaning robot can be quickly and accurately controlled to leave the second surface medium area, so as to prevent the cleaning robot from continuing to spin in the second surface medium area and being trapped.

In actual application, whether the cleaning robot has entered the second surface medium area may be detected according to actual conditions of the cleaning robot. In an exemplary embodiment of the present disclosure, whether at least a part of the cleaning robot has entered the second surface medium area is determined by detecting whether the position at which the surface medium sensor of the cleaning robot is located is within the second surface medium area. If the position at which the surface medium sensor of the cleaning robot is located is within the second surface medium area, it may be determined that at least a part of the cleaning robot has entered the second surface medium area. In this case, it is necessary to control the cleaning robot to leave the second surface medium area by traveling in an opposite direction.

Existing common surface medium sensors mainly include infrared sensor recognition apparatuses, ultrasonic sensor recognition apparatuses, main brush current detection apparatuses, and the like. Different sensor recognition apparatuses may use different specific methods to detect whether the position at which the surface medium sensor of the cleaning robot is located is within the second surface medium area. In this exemplary embodiment, the ultrasonic sensor recognition apparatus is used as an example to describe a method for detecting whether the position at which the surface medium sensor is located is within the second surface medium area.

Figure 26:
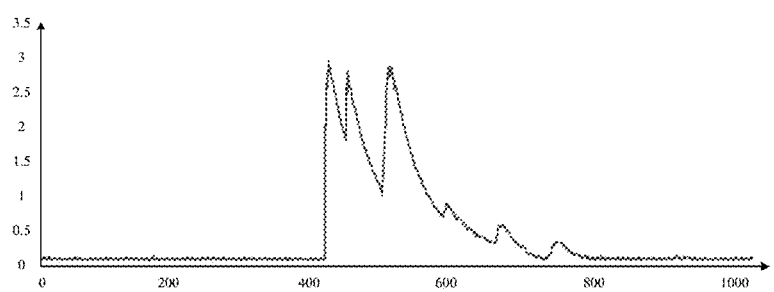
FIG. 26 shows a normal echo waveform from the ground received by an ultrasound sensor according to one embodiment of the present disclosure.
Figure 27:
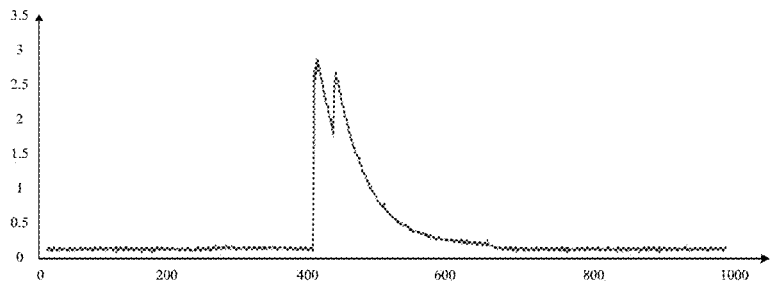
FIG. 27 shows an echo waveform from a carpet received by an ultrasound sensor according to one embodiment of the present disclosure.

In actual application, an ultrasonic sensor recognition apparatus is used to transmit an ultrasonic signal to the ground and receive an echo signal reflected by the ground. Because there is a difference between a waveform of an ultrasonic echo signal of a normal ground and a waveform of an ultrasonic echo signal of a surface of the second surface medium area, as shown in FIG. 26 and FIG. 27, a surface of the first surface medium area and the surface of the second surface medium area can be distinguished based on the difference between the echo signals. The surface of the second surface medium area is a surface of an area of the ground paved with the second surface medium. Both a waveform and a peak number of the echo signal can be used to represent the signal.

In an exemplary embodiment of the present disclosure, detecting whether the position at which the surface medium sensor of the cleaning robot is located is within the second surface medium area includes: controlling the surface medium sensor to transmit an ultrasonic signal vertically to a current surface, and receiving an actual echo signal reflected by the current surface; and determining whether the actual echo signal is different from an echo signal of the surface of the first surface medium area, and if yes, determining that the position at which the surface medium sensor is located is within the second surface medium area.

In actual application, after receiving an electrical signal, the ultrasonic sensor converts the electrical signal into an ultrasonic signal and transmits the ultrasonic signal down to a medium area surface. The above ultrasonic signal is reflected by the medium area surface, received by the ultrasonic sensor, and converted into an electrical signal. Specifically, determining a difference between the actual echo signal and the echo signal of the surface of the first surface medium area may include: determining whether a peak number of the actual echo signal is less than a peak number of the echo signal of the surface of the first surface medium area; and if the peak number of the actual echo signal is less than the peak number of the echo signal of the surface of the first surface medium area, determining that a current ground is the surface of the second surface medium area. Specifically, for different areas, the actual echo signal may be compared separately with an echo signal on a surface of a first surface medium area corresponding to a current area, so as to improve the accuracy of recognition of the second surface medium area.

In this exemplary embodiment, an echo signal of the second surface medium area is determined based on the echo signal of the surface of the first surface medium area, thereby reducing the difficulty in recognizing the second surface medium area and improving the accuracy and precision of recognizing the second surface medium area by the cleaning robot.

In an exemplary embodiment of the present disclosure, when the cleaning robot is controlled to return along the cleaned route, the cleaning robot needs to be controlled to travel in an opposite direction first and move away from the second surface medium area as far as possible. After the cleaning robot travels in the opposite direction, if the position at which the surface medium sensor of the cleaning robot is located is still within the second surface medium area, the cleaning robot is controlled to rotate in situ until it is determined that the cleaning robot leaves the second surface medium area. Then, the cleaning robot continues rotating in situ until the traveling direction of the cleaning robot is parallel to the edge of the first surface medium area. Finally, the cleaning robot is controlled to return along the traveling direction.

If the cleaning robot encounters an obstacle when traveling in the opposite direction and cannot complete a backward traveling process, but the cleaning robot still leaves the second surface medium area, the cleaning robot is directly controlled to rotate in situ until the traveling direction of the cleaning robot is parallel to the edge of the first surface medium area. Then, the cleaning robot is controlled to return along the traveling direction.

In a returning process, the cleaning robot may be controlled to return in forward mode or in backward mode. When returning in forward mode, the cleaning robot is controlled to turn back based on the cleaned route and travel along the cleaned route. When returning in backward mode, the cleaning robot is controlled to travel backward along the cleaned route. In this exemplary embodiment, to prevent the cleaning robot from continuing making a misjudgment and giving an alarm, the backward mode is used to ensure that the cleaning robot quickly returns to an initial position. The initial position herein may be a position where the cleaning robot starts cleaning along the wall, which is not limited in this exemplary embodiment.

Determining whether the cleaning robot leaves the second surface medium area is similar to determining whether the position at which the surface medium sensor of the cleaning robot is located is within the second surface medium area. When the actual echo signal is the same as the echo signal of the surface of the first surface medium area, it is determined that the cleaning robot leaves the second surface medium area. Details are not described herein again.

In an exemplary embodiment of the present disclosure, if it is determined that the second surface medium area does not exist in the room map, a mode of scanning along the edge of the second surface medium area may be enabled to scan the edge of the second surface medium area. A scanning result is stored in the room map for next use.

According to the room map recorded by the cleaning robot, whether the cleaned route of the cleaning robot is a wall-following route can be determined after the cleaning robot turns around and detects the second surface medium area; and if the cleaned route of the cleaning robot is the wall-following route, the cleaning robot is controlled to return along the wall-following route.

In an exemplary embodiment of the present disclosure, whether the second surface medium area is located behind the cleaning robot is determined based on the room map; and if the second surface medium area is located behind the cleaning robot, the cleaning robot is controlled to return along the cleaned route.

In an exemplary embodiment of the present disclosure, controlling the cleaning robot to return along the wall-following route or the cleaned route includes: controlling the cleaning robot to travel backward along the wall-following route or the cleaned route; and enabling in-situ rotation when a backward traveling distance reaches a preset distance, so that the cleaning robot can bypass the second surface medium area to escape as soon as possible.

In actual application, when the backward traveling distance reaches the preset distance, the cleaning robot is controlled to rotate in situ. When the cleaning robot rotates in situ, if the second surface medium area is detected in response to the surface medium change signal from the surface medium sensor, it indicates that the cleaning robot has not bypassed the second surface medium area, that is, has not escaped. In this case, the cleaning robot is controlled to continue to travel backward until the surface medium sensor cannot detect the surface medium change signal, and then it is determined that the cleaning robot has escaped.

In an exemplary embodiment of the present disclosure, the preset distance for backward traveling may be at least one half of a length of the robot body. Generally, after the cleaning robot travels backward by one half of the length of the robot body, it can be ensured that the cleaning robot bypasses a previous detection range in a rotating process. In actual application, the preset distance may also be another distance greater than one half of the length of the robot body, which is not particularly limited in this exemplary embodiment.

In actual application, an angle of the in-situ rotation of the cleaning robot may also range from 15 degrees to 90 degrees, and the angle of the in-situ rotation may also increase progressively. In other words, if the second surface medium area cannot be detected when the cleaning robot rotates in situ by 15 degrees, the cleaning robot is controlled to rotate by another 15 degrees or by another angle, until no surface medium change signal can be detected when the cleaning robot has rotated by 90 degrees; then, it is determined that the cleaning robot has bypassed the second surface medium area.

In actual application, there are usually cases in which the cleaning robot does not have a map of a current room, for example, a case in which the cleaning robot enters a new room, or a case in which the cleaning robot has not established a room map. In these cases, it is difficult for the cleaning robot to determine in advance a route bypassing the second surface medium area. In these cases, the escaping method of a cleaning robot provided in this exemplary embodiment of the present disclosure may include: ignoring the surface medium change signal from the surface medium sensor, and continuing controlling the cleaning robot to turn around and return along the cleaned route, thereby enabling escaping.

In an exemplary embodiment of the present disclosure, when the cleaning robot turns around, and the second surface medium area has been detected, the cleaning robot can be helped to escape by directly determining whether there is a route bypassing the second surface medium area. A method for determining the route bypassing the second surface medium area may be: searching an established room map to determine whether the second surface medium area exists in the room map. If the second surface medium area exists in the room map, whether a route bypassing the second surface medium area exists may be determined based on the room map and a boundary of the second surface medium area in the room map, thereby helping the cleaning robot to escape. In other words, if the route bypassing the second surface medium area exists, the cleaning robot is controlled to travel along the route, thereby bypassing the second surface medium area; and the cleaning robot is enabled to enter a normal cleaning mode.

If the second surface medium area is not stored in the room map, a boundary scanning mode of the cleaning robot may be enabled to scan the edge of the second surface medium area; and edge information of the second surface medium area obtained from a scanning result is stored in the room map to provide reference for next cleaning.

In an exemplary embodiment of the present disclosure, in a process of controlling the cleaning robot to turn around and return along the cleaned route, whether there is a surface medium change signal from the surface medium sensor may be detected continuously, to determine whether the surface medium change signal from the surface medium sensor disappears. If the surface medium change signal from the surface medium sensor disappears, the surface medium sensor does not send any surface medium change signals any more. In this case, it indicates that the cleaning robot leaves the second surface medium area. In this case, the cleaning robot may be controlled to continue to travel forward for a preset distance. After traveling forward for the preset distance, the cleaning robot is controlled to stop traveling and to rotate in situ in a circle to detect whether the cleaning robot leaves the second surface medium area.

In an exemplary embodiment of the present disclosure, if the surface medium sensor of the cleaning robot triggers the surface medium change signal when the cleaning robot rotates in a circle, it indicates that the cleaning robot encounters a new surface medium area, or that the cleaning robot has not completely left the second surface medium area. In this case, the cleaning robot may be controlled to continue to return along the cleaned route, thereby enabling escaping.

However, if the surface medium sensor of the cleaning robot does not trigger the surface medium change signal when the cleaning robot rotates in a circle, it indicates that the cleaning robot leaves the second surface medium area, and that there is no new surface medium area impeding the cleaning robot. In this case, the cleaning robot may be controlled to enter a normal cleaning mode to continue to clean the first surface medium area.

In actual application, the cleaning robot further includes other functions that help overall operation, details of which will not be described in this exemplary embodiment.

It should be noted that, the above method is applicable to not only a cleaning robot with a dry cleaning apparatus and a wet cleaning module, but also a sweeping robot with only a dry cleaning apparatus or a mopping robot with only a wet cleaning module, or another smart robot having an autonomous walking mechanism and needing to recognize a shape of a ground. This is not limited in this exemplary embodiment of the present disclosure.

It should be noted that although the steps of the method of the present disclosure are described in a specific order in the drawings, this does not require or imply that these steps must be performed in this specific order, or that all of the steps shown must be performed in order to achieve the desired result. Additionally or alternatively, some steps may be omitted, multiple steps may be combined into one step for execution, and/or one step may be decomposed into multiple steps for execution, and the like.

Figure 28:
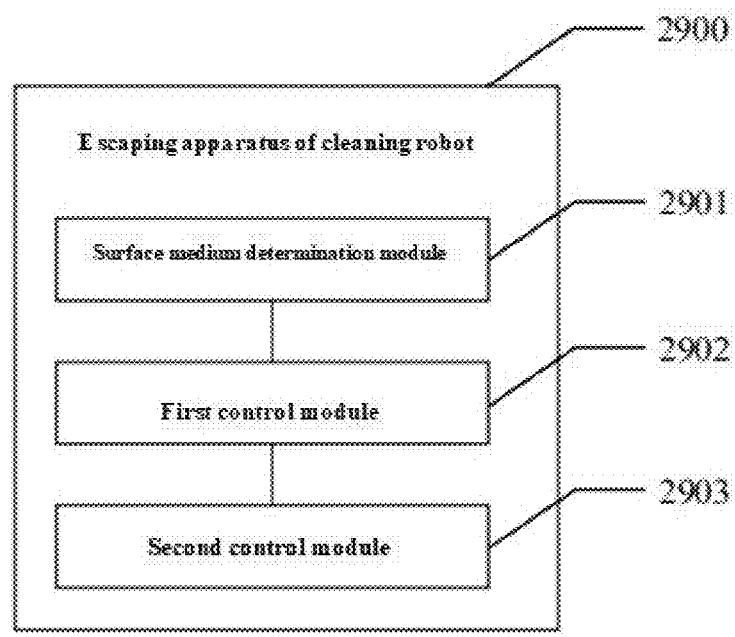
FIG. 28 is a block diagram of an escaping apparatus of a cleaning robot according to one embodiment of the present disclosure.

In an exemplary embodiment of the present disclosure, there is provided an escaping apparatus of a cleaning robot, which is applicable to a cleaning robot including a surface medium sensor. As shown in FIG. 28, the escaping apparatus 2900 of a cleaning robot includes: a surface medium determination module 2901, a first control module 2902 and a second control module 2903.

The surface medium determination module 2901 is configured to: when the cleaning robot encounters an obstacle and turns around while performing cleaning along an edge of a first surface medium area, in response to a surface medium change signal from the surface medium sensor indicates that a second surface medium area has been detected, search an established room map to determine whether the second surface medium area exists in the room map.

The first control module 2902 is configured to: if the second surface medium area exists in the room map, determine whether a route bypassing the second surface medium area exists based on the room map and a boundary of the second surface medium area in the room map; and if the route exists, control the cleaning robot to travel along the route to bypass the second surface medium area.

The second control module 2903 is configured to: if the route does not exist, control the cleaning robot to return along a cleaned route to bypass the second surface medium area.

Specific details of the modules of the above escaping apparatus of a cleaning robot have been described in detail in the corresponding escaping method of a cleaning robot, and will not be repeated herein.

It should be noted that although several modules or units of the device for action execution are mentioned in the above detailed description, this division is not mandatory. Actually, according to the embodiments of the present disclosure, the features and functions of two or more modules or units described above may be embodied in one module or unit. On the contrary, the feature and function of one module or unit described above can be further divided into multiple modules or units to be embodied.

In addition, in an exemplary embodiment of the present disclosure, an electronic device capable of implementing the above method is further provided. Those skilled in the art can understand that various aspects of the present disclosure can be implemented as a system, a method or a program product. Therefore, various aspects of the present disclosure can be specifically embodied in the following forms: a complete hardware implementation, a complete software implementation (including firmware, microcode, etc.), or an implementation combining hardware and software, which can be collectively referred to as "circuit", "module" or "system" herein.

An electronic device 3000 according to this embodiment of the present disclosure is described below with reference to FIG. 29. The electronic device 3000 shown in FIG. 29 is just an example, and should not bring any limitation to functions and a use scope of the embodiments of the present disclosure.

Figure 29:
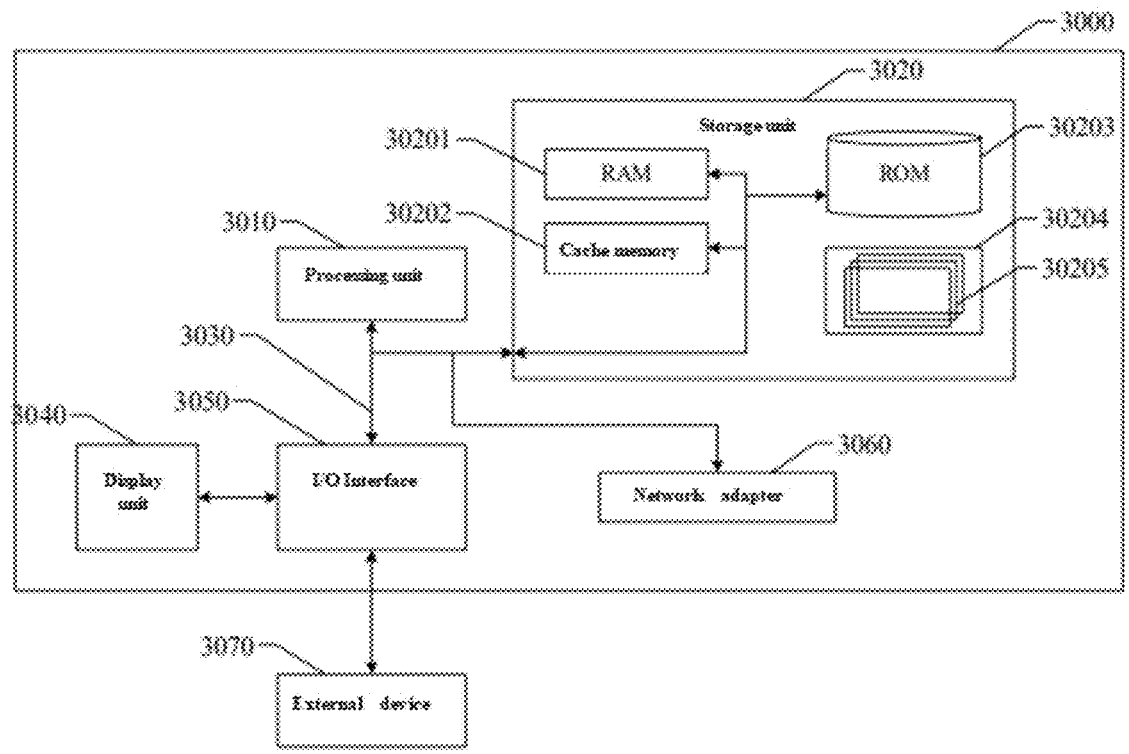
FIG. 29 is a schematic modular diagram of an electronic device according to one embodiment of the present disclosure.

As shown in FIG. 29, the electronic device 3000 is shown in the form of a general-purpose computing device. Components of the electronic device 3000 may include, but are not limited to, the above at least one processing unit 3010, the above at least one storage unit 3020, a bus 3030 connecting different system components (including the storage unit 3020 and the processing unit 3010), and a display unit 3040.

The storage unit stores a program code. The program code, when executed by the processing unit 3010, causes the processing unit 3010 to execute the steps according to various exemplary embodiments of the present disclosure described in the above section of the exemplary methods of the Description. For example, as shown in FIG. 25, the processing unit 3010 can perform the following steps: step S2610, when the cleaning robot encounters an obstacle and turns around while performing cleaning along an edge of a first surface medium area, in response to a surface medium change signal from the surface medium sensor indicates that a second surface medium area is detected, searching an established room map to determine whether the second surface medium area exists in the room map; step S2620, if the second surface medium area exists in the room map, determining whether a route bypassing the second surface medium area exists based on the room map and a boundary of the second surface medium area in the room map; if the route exists, controlling the cleaning robot to travel along the route to bypass the second surface medium area; and step S2630, if the route does not exist, controlling the cleaning robot to return along a cleaned route to bypass the second surface medium area.

The storage unit 3020 may include a readable medium in the form of a volatile storage unit, such as a random-access memory (RAM) 30201 and/or a cache memory 30202, and may further include a read-only memory (ROM) 30203.

The storage unit 3020 may also include a program/utility 30204 having a set of (at least one) program modules 30205. Such program modules 30205 include but are not limited to an operating system, one or more application programs, other program modules, and program data. Each of the operating system, one or more application programs, other program modules, and program data or some combination thereof, may include an implementation of a networking environment.

The bus 3030 may represent one or more of several types of bus structures, including a storage unit bus or storage unit controller, a peripheral bus, a graphics acceleration port, a processor, or a local bus using any of the bus structures.

The electronic device 3000 may also communicate with one or more external devices 3070 (for example, a keyboard, a pointing device, a Bluetooth device, etc.), and may also communicate with one or more devices enabling a user to interact with the electronic device 3000, and/or any devices (such as a router and a modem) enabling the electronic device 3000 to communicate with one or more other computing devices. Such communication may be performed through an input/output (I/O) interface 3050. Moreover, the electronic device 3000 may also communicate with one or more networks (for example, a LAN, a WAN and/or a public network such as the Internet) through a network adapter 3060. As shown in the figure, the network adapter 3060 communicates with other modules of the electronic device 3000 through the bus 3030. It should be understood that although not shown in the figure, other hardware and/or software modules may be used in conjunction with the electronic device 3000, and may include but not are limited to a microcode, a device driver, a redundant processing unit, an external disk drive array, an RAID system, a magnetic tape drive, a data backup storage system, etc.

Through the description of the above embodiments, those skilled in the art can easily understand that the exemplary embodiments described herein can be realized by software, or by combining software with necessary hardware. Therefore, the technical solutions according to the embodiments of the present disclosure can be embodied in the form of a software product. The software product may be stored in a non-volatile storage medium (which may be a CD-ROM, a U disk, a mobile hard disk, etc.) or on the network, and includes several instructions, wherein the instructions, when executed by a computing device (which may be a personal computer, a server, a terminal device, a network device, or the like), cause the computing device to execute the method according to the embodiments of the present disclosure.

In an exemplary embodiment of the present disclosure, a computer storage medium capable of implementing the above method is further provided. A program product capable of implementing the above method of the Description is stored in the computer storage medium. In some possible embodiments, various aspects of the present disclosure may also be implemented in the form of a program product, which includes a program code. The program code, when running on a terminal device, causes the terminal device to execute the steps according to various exemplary embodiments of the present disclosure described in the above section of the exemplary methods of the Description.

Figure 30:
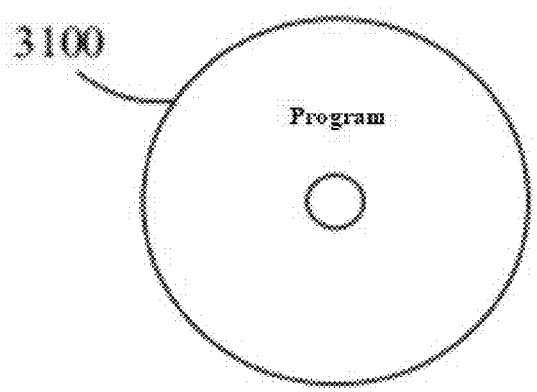
FIG. 30 is a schematic diagram of program product according to one embodiment of the present disclosure.

Referring to FIG. 30, a program product 3100 for implementing the above method according to an embodiment of the present disclosure is described, may adopt a portable compact disc read-only memory (CD-ROM) and include a program code, and may run on a terminal device, such as a personal computer. However, the program product of the present disclosure is not limited to this. In the present disclosure, the readable storage medium may be any tangible medium containing or storing a program which may be used by or used in combination with an instruction execution system, apparatus, or device.

The program product may adopt any combination of one or more readable media. The readable medium may be a readable signal medium or a readable storage medium. The readable storage medium may be, for example but not limited to, an electronic, magnetic, optical, electromagnetic, infrared, or semiconductor system, apparatus, or device, or any combination of the foregoing. More specific (non-exhaustive lists) examples of the readable storage medium include: an electrical connection having one or more wires, a portable diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The computer-readable signal medium may include a data signal carrying a readable program code that is propagated in a baseband or as part of a carrier wave. The propagated data signal may be in various forms, including but not limited to, electromagnetic signals, optical signals or any suitable combination of the foregoing. The readable signal medium may also be any readable medium except the readable storage medium. The readable medium may send, propagate or transmit a program for use by or use in combination with an instruction execution system, apparatus or device.

The program code contained on the readable medium may be transmitted by any appropriate medium, including but not limited to wireless, a wired, an optical fiber cable, RF, etc., or any suitable combination of the foregoing.

The program code for executing the operations of the present disclosure may be written in one or more programming languages or any combination thereof, the programming languages including object-oriented programming languages such as Java and C++, as well as conventional procedural programming languages such as "C" language or similar programming languages. The program code may be executed entirely or partly on a user computing device, or executed as an independent software package, or executed partly on the user computing device and partly on a remote computing device, or executed entirely on the remote computing device or server. In a case involving the remote computing device, the remote computing device may be connected to the user computing device via any kind of network, including a local area network (LAN) or a wide area network (WAN), or may be connected to an external computing device (e.g., via the Internet provided by an Internet service provider).

In addition, the above accompany drawings are only a schematic illustration of the processing steps included in the method according to the exemplary embodiment of the present disclosure, and are not intended for limitation. It is easy to understand that the processing steps shown in the above figures does not indicate or limit the time sequence of theses processing steps. In addition, it is also easy to understand that these processing steps can be performed synchronously or asynchronously in, for example, a plurality of modules.

Other embodiments of the present disclosure will be apparent to those skilled in the art from consideration of the description and practice of the present disclosure. The present disclosure is intended to cover any variations, uses, or adaptations of the present disclosure following the general principles thereof and including such departures from the present disclosure as come within known or customary practice in the art. It is intended that the description and examples be considered as exemplary only, with a true scope and spirit of the present disclosure being indicated by the claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An escaping method of a cleaning robot applied to a cleaning robot comprising a surface medium sensor, the escaping method comprising:
   when the cleaning robot encounters an obstacle and turns around while performing cleaning along an edge of a first surface medium area, in response to a surface medium change signal from the surface medium sensor indicates that a second surface medium area is detected, searching an established room map to determine whether the second surface medium area exists in the room map;
   if the second surface medium area exists in the room map, determining whether a route bypassing the second surface medium area exists based on the room map and a boundary of the second surface medium area in the room map;
   if the route exists, controlling the cleaning robot to travel along the route to bypass the second surface medium area; and
   if the route does not exist, controlling the cleaning robot to return along a cleaned route to bypass the second surface medium area.

2. The escaping method of the cleaning robot according to claim 1, further comprising: if the second surface medium area does not exist in the room map, scanning an edge of the second surface medium area, and storing a scanning result in the room map.

3. The escaping method of the cleaning robot according to claim 1, wherein, when the cleaning robot encounters the obstacle and turns around while performing cleaning along the edge of the first surface medium area, in response to the surface medium change signal from the surface medium sensor that indicates that the second surface medium area is detected, the method further comprises:
   detecting whether at least a part of the cleaning robot has entered the second surface medium area; and
   if at least a part of the cleaning robot has entered the second surface medium area, controlling the cleaning robot to travel in an opposite direction to leave the second surface medium area.

4. The escaping method of the cleaning robot according to claim 3, wherein detecting whether at least a part of the cleaning robot has entered the second surface medium area comprises:
   detecting whether a position at which the surface medium sensor of the cleaning robot is located is within the second surface medium area; and
   if the position at which the surface medium sensor is located is within the second surface medium area, determining that the cleaning robot has entered the second surface medium area.

5. The escaping method of the cleaning robot according to claim 4, wherein detecting whether the position at which the surface medium sensor of the cleaning robot is located is within the second surface medium area comprises:
   controlling the surface medium sensor to transmit an ultrasonic signal vertically to a current surface, and receiving an actual echo signal reflected by the current surface, wherein the surface medium sensor is an ultrasonic sensor; and
   determining whether the actual echo signal is different from an echo signal of the first surface medium area, and if it is different, determining that the position at which the surface medium sensor is located is within the second surface medium area.

6. The escaping method of the cleaning robot according to claim 3, wherein controlling the cleaning robot to return along the cleaned route comprises:
   when it is determined that the cleaning robot leaves the second surface medium area, controlling the cleaning robot to rotate in situ, so that a traveling direction of the cleaning robot is parallel to an edge of the first surface medium area; and
   controlling the cleaning robot to return along the traveling direction.

7. The escaping method of the cleaning robot according to claim 1, wherein, after the second surface medium area is detected, the method further comprises:
   detecting whether the cleaned route of the cleaning robot is a wall-following route; and
   if the cleaned route of the cleaning robot is the wall-following route, controlling the cleaning robot to return along the wall-following route.

8. The escaping method of the cleaning robot according to claim 7, further comprising:
   determining, based on the room map, whether the second surface medium area is located behind the cleaning robot; and if the second surface medium area is located behind the cleaning robot, controlling the cleaning robot to return along the cleaned route.

9. The escaping method of the cleaning robot according to claim 8, wherein controlling the cleaning robot to return along the wall-following route or the cleaned route comprises:
controlling the cleaning robot to travel backward along the wall-following route or the cleaned route;
enabling in-situ rotation when a backward traveling distance reaches a preset distance; and
if the second surface medium area is detected in response to the surface medium change signal from the surface medium sensor, controlling the cleaning robot to continue to travel backward, until the surface medium sensor cannot detect the surface medium change signal.

10. The escaping method of the cleaning robot according to claim 1, wherein, if the route does not exist, the method further comprises: ignoring the surface medium change signal from the surface medium sensor, and continuing controlling the cleaning robot to turn around and return along the cleaned route.

11. The escaping method of the cleaning robot according to claim 10, wherein, in a process of ignoring the surface medium change signal from the surface medium sensor and controlling the cleaning robot to turn around and return along the cleaned route, the method further comprises:
detecting whether the surface medium change signal from the surface medium sensor disappears; and
if the surface medium change signal from the surface medium sensor disappears, controlling the cleaning robot to travel forward by a preset distance and then to stop traveling and rotate in a circle, and detecting whether the cleaning robot leaves the second surface medium area.

12. The escaping method of the cleaning robot according to claim 11, wherein detecting whether the cleaning robot leaves the second surface medium area comprises:
if the surface medium sensor triggers the surface medium change signal, controlling the cleaning robot to continue to return along the cleaned route; and
if the surface medium sensor does not trigger the surface medium change signal, entering a normal cleaning mode.

13. The escaping method of the cleaning robot according to claim 1, wherein the method is configured for use when the cleaning robot is in a mode in which only the first surface medium area is to be cleaned.

14. A non-transitory computer-readable storage medium storing a computer program thereon, wherein the computer program, when executed by a processor, implements an escaping method of a cleaning robot, applied to a cleaning robot comprising a surface medium sensor, the escaping method comprising:
when the cleaning robot encounters an obstacle and turns around while performing cleaning along an edge of a first surface medium area, in response to a surface medium change signal from the surface medium sensor indicates that a second surface medium area is detected, searching an established room map to determine whether the second surface medium area exists in the room map;
if the second surface medium area exists in the room map, determining whether a route bypassing the second surface medium area exists based on the room map and a boundary of the second surface medium area in the room map;
if the route exists, controlling the cleaning robot to travel along the route to bypass the second surface medium area; and
if the route does not exist, controlling the cleaning robot to return along a cleaned route to bypass the second surface medium area.

15. An electronic device comprising:
a processor; and
a memory, for storing processor-executable instructions, wherein the processor is configured to execute the processor-executable instructions to perform an escaping method of a cleaning robot, applied to a cleaning robot comprising a surface medium sensor, the escaping method comprising:
when the cleaning robot encounters an obstacle and turns around while performing cleaning along an edge of a first surface medium area, in response to a surface medium change signal from the surface medium sensor indicates that a second surface medium area is detected, searching an established room map to determine whether the second surface medium area exists in the room map;
if the second surface medium area exists in the room map, determining whether a route bypassing the second surface medium area exists based on the room map and a boundary of the second surface medium area in the room map;
if the route exists, controlling the cleaning robot to travel along the route to bypass the second surface medium area; and
if the route does not exist, controlling the cleaning robot to return along a cleaned route to bypass the second surface medium area.

16. The electronic device according to claim 15, wherein the method further comprises: if the second surface medium area does not exist in the room map, scanning an edge of the second surface medium area, and storing a scanning result in the room map.

17. The electronic device according to claim 15, wherein, when the cleaning robot encounters the obstacle and turns around while performing cleaning along the edge of the first surface medium area, in response to the surface medium change signal from the surface medium sensor indicates that the second surface medium area is detected, the method further comprises:
detecting whether at least a part of the cleaning robot has entered the second surface medium area; and
if at least a part of the cleaning robot has entered the second surface medium area, controlling the cleaning robot to travel in an opposite direction to leave the second surface medium area.

18. The electronic device according to claim 15, wherein, after the second surface medium area is detected, the method further comprises:
detecting whether the cleaned route of the cleaning robot is a wall-following route; and
if the cleaned route of the cleaning robot is the wall-following route, controlling the cleaning robot to return along the wall-following route.

19. The electronic device according to claim 15, wherein, if the route does not exist, the method further comprises: ignoring the surface medium change signal from the surface medium sensor, and continuing controlling the cleaning robot to turn around and return along the cleaned route.

20. The electronic device according to claim 15, wherein the method is configured for use when the cleaning robot is in a mode in which only the first surface medium area is to be cleaned.

* * * * *